US008629847B2

(12) United States Patent
Arai et al.

(10) Patent No.: US 8,629,847 B2
(45) Date of Patent: Jan. 14, 2014

(54) INFORMATION PROCESSING DEVICE, DISPLAY METHOD AND PROGRAM

(75) Inventors: Koji Arai, Tokyo (JP); Akiko Terayama, Tokyo (JP); Ryo Takaoka, Tokyo (JP); QiHong Wang, Tokyo (JP); Satoshi Akagawa, Tokyo (JP)

(73) Assignee: Sony Corporation, Tokyo (JP)

( * ) Notice: Subject to any disclaimer, the term of this patent is extended or adjusted under 35 U.S.C. 154(b) by 236 days.

(21) Appl. No.: 12/852,124

(22) Filed: Aug. 6, 2010

(65) Prior Publication Data

US 2011/0063236 A1 Mar. 17, 2011

(30) Foreign Application Priority Data

Sep. 14, 2009 (JP) ................................. 2009-212071

(51) Int. Cl.
*G06F 3/041* (2006.01)
*G06F 3/048* (2013.01)

(52) U.S. Cl.
USPC ........................... 345/173; 715/812; 715/822

(58) Field of Classification Search
USPC .......... 345/173; 715/708, 812, 811, 746, 821, 715/822
See application file for complete search history.

(56) References Cited

U.S. PATENT DOCUMENTS

| | | | |
|---|---|---|---|
| 6,301,440 B1 * | 10/2001 | Bolle et al. ..................... | 396/128 |
| 6,919,927 B1 * | 7/2005 | Hyodo ..................... | 348/333.02 |
| 2005/0206746 A1 * | 9/2005 | Cazier et al. ................ | 348/231.2 |
| 2007/0004451 A1 * | 1/2007 | C. Anderson ............... | 455/556.1 |
| 2007/0065137 A1 * | 3/2007 | Hara et al. ..................... | 396/291 |
| 2007/0094620 A1 * | 4/2007 | Park .............................. | 715/862 |
| 2007/0106464 A1 * | 5/2007 | Yamada ........................ | 701/208 |
| 2009/0037326 A1 * | 2/2009 | Chitti et al. ...................... | 705/39 |
| 2009/0275886 A1 * | 11/2009 | Blomquist et al. .............. | 604/66 |
| 2010/0082437 A1 * | 4/2010 | Tamayama et al. ......... | 705/14.58 |
| 2010/0306650 A1 * | 12/2010 | Oh et al. ....................... | 715/702 |

FOREIGN PATENT DOCUMENTS

JP 2009-9424 1/2009

OTHER PUBLICATIONS

U.S. Appl. No. 13/511,167, filed May 22, 2012, Arai.

* cited by examiner

*Primary Examiner* — Ariel Balaoing
*Assistant Examiner* — Christopher Kohlman
(74) *Attorney, Agent, or Firm* — Oblon, Spivak, McClelland, Maier & Neustadt, L.L.P.

(57) ABSTRACT

There is provided an information processing device that includes: a display portion that displays a plurality of function buttons that respectively correspond to a plurality of functions included in the information processing device; a position detection portion that detects a position where an operating body touches or approaches a display screen of the display portion; a button selection portion that selects, from among the plurality of function buttons, at least one function button that corresponds to an operation state of the information processing device; and a display control portion that causes the function button selected by the button selection portion to move on the display screen such that the function button approaches the position on the display screen detected by the position detection portion.

13 Claims, 11 Drawing Sheets

FIG. 2
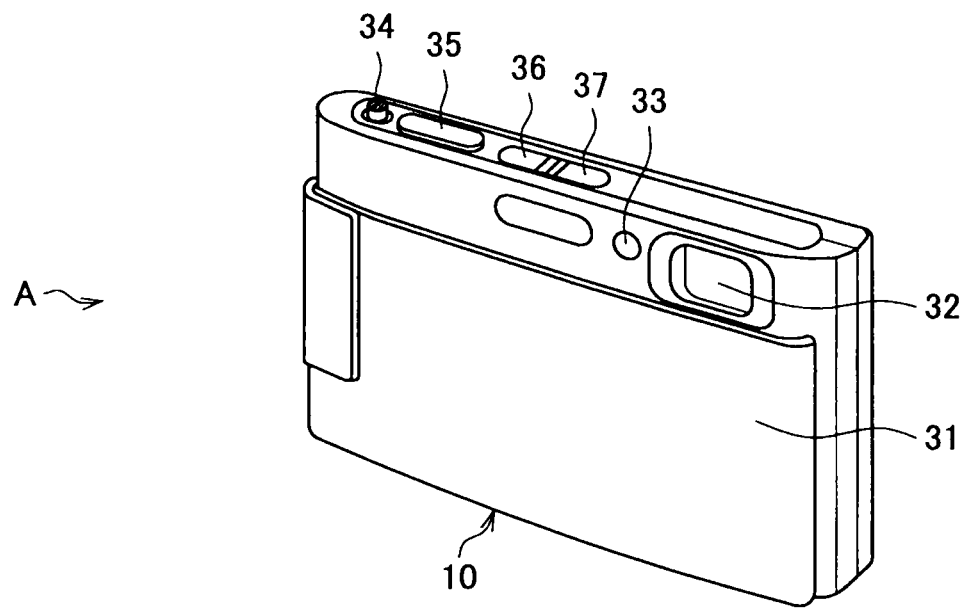
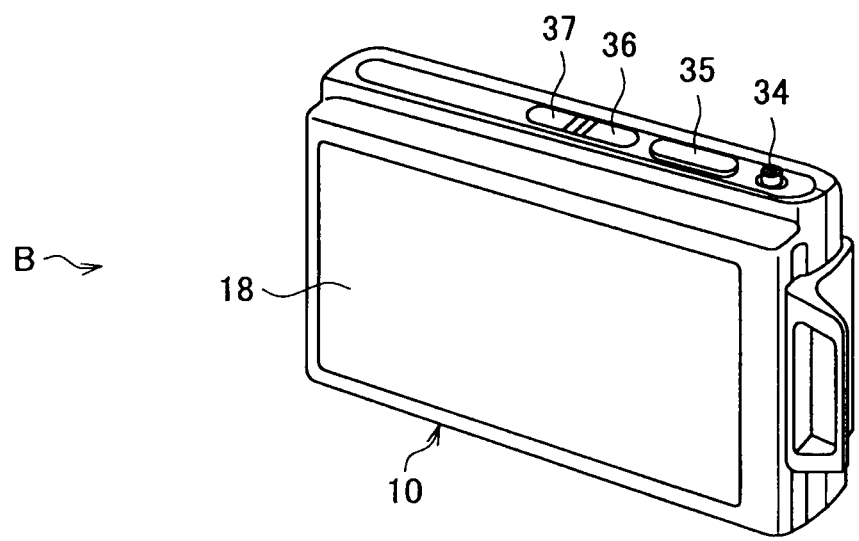

INFORMATION PROCESSING DEVICE, DISPLAY METHOD AND PROGRAM

BACKGROUND OF THE INVENTION

1. Field of the Invention

The present invention relates to an information processing device, a display method and a program.

2. Description of the Related Art

In recent years, touch panels are widely used as operation portions of mobile (portable) devices, such as digital cameras, portable video/audio players and mobile phones. With a mobile device equipped with a touch panel, when a user taps a function button displayed on a display screen of the mobile device, the user can instruct the mobile device to perform a function corresponding to the function button (refer to Japanese Patent Application Publication No. JP-A-2009-009424, for example). For example, when moving images are recorded using a digital camera, the user looks for a recording start button (a REC button) on the display screen, and presses the REC button to start recording of the moving images.

SUMMARY OF THE INVENTION

However, in recent years, mobile devices are provided with a wide variety of functions. Further, a multi-function device that functions as a digital camera, a mobile phone and a video/audio player etc. is also available. When a single device has a wide variety of functions in this manner, convenience can be provided to the user. Meanwhile, operability by the user becomes complicated to perform these many functions.

For example, when a digital camera equipped with a touch panel has many functions, many function buttons are displayed on the display screen. As a result, it is difficult for the user to find a desired function button from among them. Further, even when the many function buttons are classified and hierarchically displayed, only a user who is familiar with the device can find the location of the desired function button, and generally it is difficult to find that button. Furthermore, when various types of function buttons are displayed in a mixed manner, the user cannot understand which function button corresponds to which function. As a result, it is more difficult for the user to find the function button that corresponds to a desired function.

Particularly, on a complicated and dynamic display screen, the user may have difficulty in finding the desired function button, and the user may have difficulty in pressing the function button at a desired timing. For example, a live view image that is being captured is displayed on the display screen, in an image capture mode of the digital camera. Let us consider a case in which many function buttons including a REC button (a white button, for example) are superimposed and displayed on the live view image (a white subject, for example). In this case, it is difficult for the user to find the REC button on the display screen and to press the REC button at an intended recording timing.

As described above, the number of the function buttons on the display screen has been increased, and a display manner of the function buttons has become complicated. As a result, it is difficult for the user to find the function button to perform the desired function.

In light of the foregoing, it is desirable to enable a user to easily find a function button to perform a desired function, even when a display screen has a complicated layout.

According to an embodiment of the present invention, there is provided an information processing device including a display portion that displays a plurality of function buttons that respectively correspond to a plurality of functions included in the information processing device, a position detection portion that detects a position where an operating body touches or approaches a display screen of the display portion, a button selection portion that selects, from among the plurality of function buttons, at least one function button that corresponds to an operation state of the information processing device, and a display control portion that causes the function button selected by the button selection portion to move on the display screen such that the function button approaches the position on the display screen detected by the position detection portion.

The information processing device may further include an environment detection portion that detects a surrounding environment of the information processing device. The button selection portion may select, from among the plurality of function buttons, a function button that corresponds to the operation state of the information processing device, and also corresponds to the surrounding environment of the information processing device.

The information processing device may further include an object recognition portion that recognizes an object that is being displayed on the display screen. The button selection portion may select, from among the plurality of function buttons, a function button that corresponds to the operation state of the information processing device, and also corresponds to the object that is being displayed on the display screen.

The button selection portion may select, from among the plurality of function buttons, a function button that corresponds to the operation state of the information processing device, and also corresponds to the position on the display screen detected by the position detection portion.

The button selection portion may select, from among the plurality of function buttons, a function button that corresponds to the operation state of the information processing device, and also corresponds to an icon that is displayed at the position on the display screen detected by the position detection portion.

The button selection portion may select, from among the plurality of function buttons, a function button that corresponds to the operation state of the information processing device, and also corresponds to one of a current position and a current time of the information processing device.

The button selection portion may select, from among the plurality of function buttons, a function button that corresponds to the operation state of the information processing device, and also corresponds to one of a contact pressure and a contact time of the operating body on the display screen.

The information processing device may further include a posture sensor that detects a posture of the information processing device. The button selection portion may select, from among the plurality of function buttons, a function button that corresponds to the operation state of the information processing device, and also corresponds to the posture of the information processing device.

According to another embodiment of the present invention, there is provided a display method, including the steps of displaying a plurality of function buttons that respectively correspond to a plurality of functions capable of being performed by an information processing device, detecting a position where an operating body touches or approaches a display screen of a display portion, selecting, from among the plurality of function buttons, at least one function button that corresponds to an operation state of the information processing device, and causing the selected function button to move on the display screen such that the selected function button approaches the detected position on the display screen.

According to another embodiment of the present invention, there is provided a program including instructions that command a computer to perform the steps of displaying a plurality of function buttons that respectively correspond to a plurality of functions capable of being performed by an information processing device, detecting a position where an operating body touches or approaches a display screen of a display portion, selecting, from among the plurality of function buttons, at least one function button that corresponds to an operation state of the information processing device, and causing the selected function button to move on the display screen such that the selected function button approaches the detected position on the display screen.

With the above-described structure, a plurality of function buttons that respectively correspond to a plurality of functions that can be performed by the information processing device are displayed, and a position where an operating body touches or approaches the display screen of the display portion is detected. Further, at least one function button corresponding to an operation state of the information processing device is selected from among the plurality of function buttons, and the selected function button is moved on the display screen such that the selected function button approaches the position on the display screen detected by the position detection portion.

According to the embodiments of the present invention described above, the user can easily find a function button to perform a desired function, even when the display screen has a complicated layout.

BRIEF DESCRIPTION OF THE DRAWINGS

FIG. 2A is a front perspective view of the imaging device according to the present embodiment;

FIG. 2B is a rear perspective view of the imaging device according to the present embodiment;

DETAILED DESCRIPTION OF THE EMBODIMENT(S)

Figure 1:
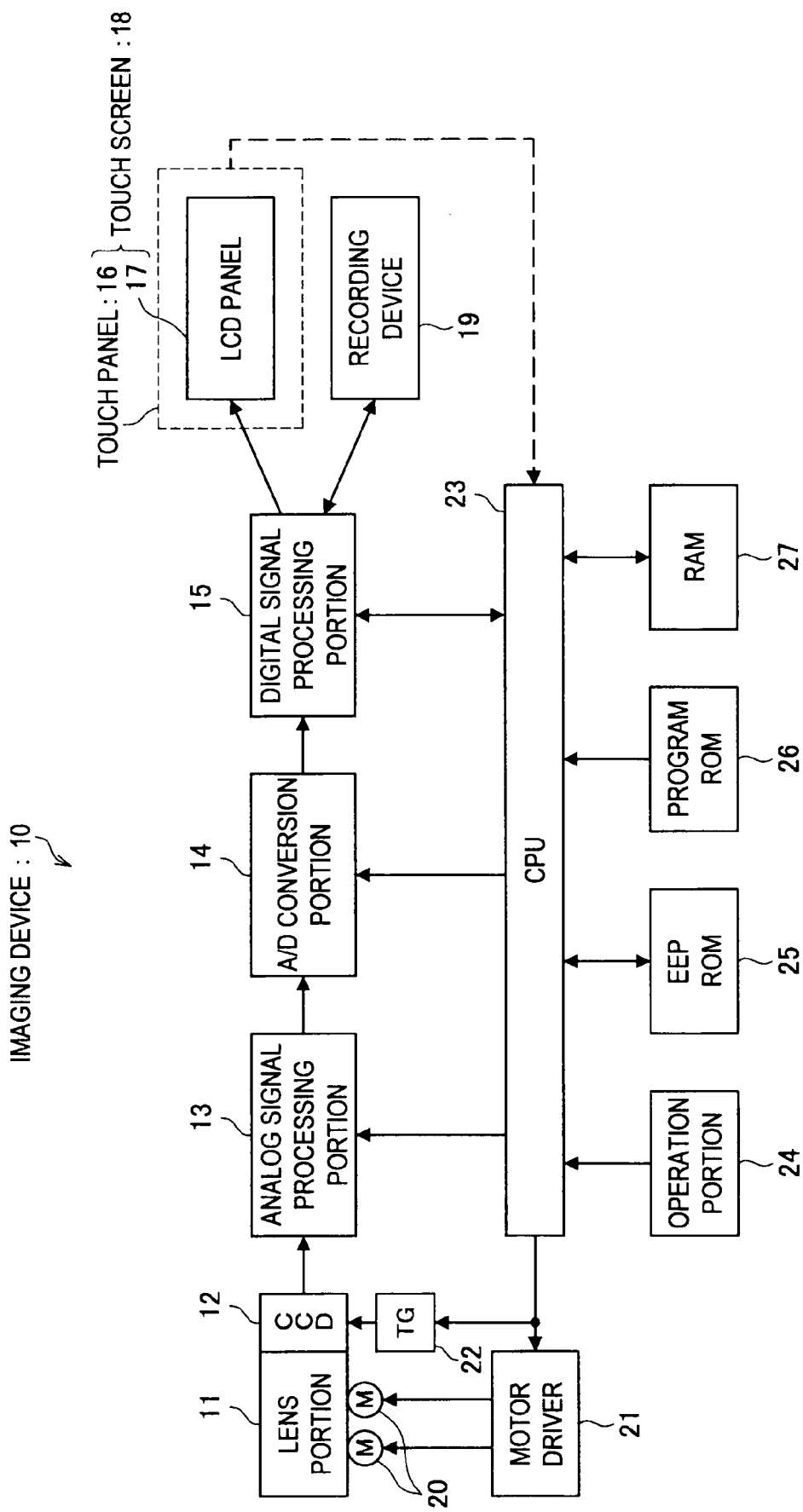
FIG. 1 is a block diagram showing a hardware configuration of an imaging device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that a description will be made in the following order.
1. Hardware configuration of imaging device
2. Functional structure of imaging device
3. Flow of display method
4. Specific examples of display screen
5. Other embodiments
6. Conclusion 1. Hardware Configuration of Imaging Device First, a hardware configuration of an imaging device 10 according to a first embodiment of the present invention will be described in detail with reference to FIG. 1. FIG. 1 is a block diagram showing the hardware configuration of the imaging device 10 according to the present embodiment. An information processing device of the present invention is embodied by the imaging device 10 shown in FIG. 1, for example. However, the information processing device of the present invention is not limited to this example, and is applicable to a given electronic device.

As shown in FIG. 1, the imaging device 10 according to the present embodiment is, for example, a digital camera (for example, a digital still camera or a digital video camera) that is capable of capturing still images or moving images. The imaging device 10 captures a subject and records, on a recording medium, a still image or a moving image obtained by capturing the subject, as image data in a digital format.

As shown in FIG. 1, the imaging device 10 according to the present embodiment is provided with an imaging portion that includes a lens portion 11, an imaging element 12, actuators 20, a motor driver 21, and a timing generator (TG) 22. The imaging portion captures the subject, and outputs an image signal obtained by capturing the subject.

The lens portion 11 is provided with an optical system (not shown in the figures) that includes an imaging lens, an aperture, a focus lens, and a zoom lens etc. The imaging element 12 is arranged on an optical path of a subject's light incident through the lens portion 11. The imaging element 12 may be a charge coupled device (CCD), a complementary metal oxide semiconductor (C-MOS) or the like. The imaging element 12 photoelectrically converts an optical image focused on an imaging surface by the lens portion 11, and thereby outputs an image signal.

An output of the imaging element 12 is connected to an input of a digital signal processing portion 15 via an analog signal processing portion 13 and an analog/digital (A/D) conversion portion 14. Then, an output of the digital signal processing portion 15 is electrically connected to an input of a liquid crystal display (LCD) panel 17 and an input of a recording device 19. The analog signal processing portion 13, the A/D conversion portion 14 and the digital signal processing portion 15 form a signal processing portion. The signal processing portion performs predetermined signal processing on the image signal output from the imaging element 12, and outputs the processed image signal to the liquid crystal display panel 17 or the recording device 19.

The actuators 20 are mechanically connected to the lens portion 11. The actuators 20 are a drive mechanism for adjusting the aperture and moving the focus lens. The actuators 20 are connected to the motor driver 21 that performs drive control of the actuators 20. The motor driver 21 controls an operation of each portion of the imaging portion, based on an instruction from a CPU 23. For example, during image capture, the motor driver 21 controls the drive mechanism of the imaging portion such that the subject is captured with an appropriate focus, exposure and the like in accordance with a user operation on an operation portion 24 or a touch panel 16, thereby driving the zoom lens, the focus lens and the aperture etc. Further, based on an instruction from the CPU 23, the TG 22 outputs, to the imaging element 12, a timing signal to control an imaging timing of the imaging element 12.

The touch panel 16 is an example of a position detection portion that detects a position where an operating body touches or approaches a display screen of a display portion. The liquid crystal display panel 17 is an example of the display portion, and is formed by a liquid crystal display (LCD) or the like. The liquid crystal display panel 17 displays various types of data, such as images, texts and icons. The touch panel 16 is arranged such that it is superimposed on the display screen of the liquid crystal display panel 17. The touch panel 16 and the liquid crystal display panel 17 form a touch screen 18. The touch panel 16 functions as an operation portion that receives a user operation on the imaging device 10, and detects the position on the display screen of the liquid crystal display panel 17 that is specified by the user.

Here, the touch panel 16 will be described in more detail. The touch panel 16 is provided with a sensor that detects the position where the operating body touches or approaches the display screen of the liquid crystal display panel 17. The touch panel 16 thereby detects the position on the display screen specified by the user using the operating body, as well as a movement trajectory and a movement speed of the operating body. The operating body used for operation of the touch panel 16 is, for example, a finger of the user, a stylus, a touch pen or the like. The touch panel 16 detects coordinates of the position on the display screen where the operating body touches or approaches. The detected coordinate information is transmitted to the CPU 23 and predetermined processing is performed thereon.

Any type of touch panel, for example, a pressure sensitive touch panel, an electrostatic touch panel, an optical touch panel or the like may be used as the touch panel 16. The pressure sensitive touch panel detects changes in pressure when the operating body presses the panel. The electrostatic touch panel detects an electric signal caused by static electricity due to the touch of the operating body on the panel. Generally, the optical touch panel detects the position or the movement direction of the operating body that touches the panel, using an optical sensor provided on an outer frame of the display panel. Further, as another type of optical sensor, an in-cell type optical touch panel is also known. With the in-cell type optical touch panel, the display panel is provided with an optical sensor array. The optical sensor array is used to detect the position or the movement trajectory of the operating body that touches or approaches the display panel.

A touch type touch panel (for example, the above-described pressure sensitive touch panel or electrostatic touch panel) that detects the touch of the operating body is generally used as the touch panel 16. The user can perform various operations on the imaging device 10, by pressing (or tapping) the surface of the touch panel 16 using a finger or a stylus, or by moving the finger or the stylus while pressing the surface.

Note that a non-touch type touch panel (for example, the above-described optical touch panel) is also known that can recognize the operating body approaching the touch panel even when the operating body does not directly touch the touch panel. Hereinafter, for explanatory convenience, a touch type touch panel that detects a position (a tap position) touched by the operating body (for example, a finger) is used as an example. However, the position detection portion of the present invention may be, for example, a non-touch type touch panel or another screen position detecting device, as long as it can detect the position on the display screen specified by the user.

The recording device 19 includes a removable recording medium, which is for example, an optical disc such as a digital versatile disc (DVD), a memory card, a magnetic tape or the like. Various types of data such as images, audio and the like are recorded on the removable recording medium. Further, the recording device 19 may be a semiconductor memory incorporated in the imaging device 10, or may be a disk device such as a hard disk drive (HDD). The recording device 19 records, as image data, the image signal that has been processed by the signal processing portion based on an instruction from the CPU 23, on the recording medium. The recording device 19 corresponds to a recording portion that records the image data obtained by image capture. In addition, the recording device 19 can also play back the data recorded on the recording medium.

The central processing unit (CPU) 23 functions as a control portion that controls each portion of the imaging device 10. The CPU 23 is connected to the motor driver 21, the TG 22, the operation portion 24, an electrically erasable programmable ROM (EEPROM) 25, a program read only memory (ROM) 26, a random access memory (RAM) 27, and the touch panel 16.

The semiconductor memories 25 to 27 function as a storage portion that stores various types of data. For example, the EEPROM 25 stores data that should be held even when a power source of the imaging device 10 is turned off, such as various set data. The program ROM 26 stores a program executed by the CPU 23, and data necessary to execute the program. The RAM 27 temporarily stores a program and data that are necessary, as a work area, when the CPU 23 executes various kinds of processing. The CPU 23 performs various kinds of processing by reading the program stored in the storage medium, such as the program ROM 26, and by executing the program while using the RAM 27.

The operation portion 24 is an operation unit that is provided separately from the touch panel 16. The operation portion 24 includes, for example, a shutter button, a mechanical button such as a power source button, a switch, a lever, a dial, and a cross key. Further, the operation portion 24 may include a touch sensor that detects a predetermined user input, an optical sensor and the like. The operation portion 24 is operated by the user, and supplies a signal corresponding to the user operation to the CPU 23.

Next, an example of an external structure of the imaging device 10 according to the present embodiment will be described with reference to FIG. 2A and FIG. 2B. FIG. 2A is a front perspective view of the imaging device 10 according to the present embodiment, and FIG. 2B is a rear perspective view of the imaging device 10 according to the present embodiment.

As shown in FIG. 2A, a front surface of the imaging device 10 is covered with a slide type lens cover 31. An imaging lens 32 and an auto focus (AF) illuminator 33 included in the above-described lens portion 11 are arranged such that they are exposed when the lens cover 31 of the front surface is opened by sliding it downward. The AF illuminator 33 also serves as a self-timer lamp. Further, as shown in FIG. 2B, the above-described touch screen 18 is provided on a rear surface of the imaging device 10 such that the touch screen 18 occupies most of the rear surface.

Further, a zoom lever (TELE/WIDE) 34, a shutter button 35, a playback button 36, and a power button 37 are arranged on an upper surface of the imaging device 10. These buttons 34 to 37 are an example of the above-described operation portion 24 shown in FIG. 1. Note that the user can give an instruction (a release instruction) of an imaging operation of a still image by pressing the shutter button 35. However, with the imaging device 10 according to the present embodiment, image capture can be performed only by an input operation on the touch panel 16. Therefore, the shutter button 35 may be omitted.

Next, an operation of the imaging device 10 structured as described above will be described. The CPU 23 controls each portion of the imaging device 10 by executing the program stored in the program ROM 26. Then, the CPU 23 performs predetermined processing in accordance with a signal from the touch panel 16 or a signal from the operation portion 24. For example, when the touch panel 16 is pressed (tapped) by a finger touching a given position on the touch panel 16, in other words, when a predetermined operation input is performed by the user, the coordinates of the tapped position are detected by the touch panel 16, and a signal indicating the coordinates is transmitted to the CPU 23. The CPU 23 acquires predetermined information corresponding to the coordinates, and performs the predetermined processing based on the information.

(1) AF Control

At the time of image capture, first, when the subject's light enters the imaging element 12 through the lens portion 11, the imaging element 12 captures the subject within an imaging range. More specifically, the imaging element 12 photoelectrically converts an optical image focused on the imaging surface by the lens portion 11, and thereby outputs an analog image signal. At this time, the motor driver 21 drives the actuators 20 under control of the CPU 23. Due to the drive, the lens portion 11 is extended from and retracted into a housing of the imaging device 10. Further, due to the drive, the aperture of the lens portion 11 is adjusted, and the focus lens of the lens portion 11 is moved. In this manner, the focus of the lens portion 11 is automatically focused on the subject within an AF area (auto focus control).

(2) AE Control

Further, the timing generator 22 supplies a timing signal to the imaging element 12 under control of the CPU 23. An exposure time of the imaging element 12 is controlled by the timing signal. The imaging element 12 operates based on the timing signal supplied from the timing generator 22. The imaging element 12 thereby receives light from the subject that enters through the lens portion 11, and performs photoelectric conversion. Then, the imaging element 12 supplies an analog image signal, which is an electric signal corresponding to the amount of the received light, to the analog signal processing portion 13. In this manner, the exposure of the image obtained by capturing the subject is automatically adjusted to be appropriate (auto exposure control).

(3) Signal Processing

Under control of the CPU 23, the analog signal processing portion 13 performs analog signal processing (amplification and the like) on the analog image signal output from the imaging element 12, and supplies an image signal obtained as a result of the processing to the A/D conversion portion 14. Under control of the CPU 23, the A/D conversion portion 14 performs A/D conversion on the analog image signal from the analog signal processing portion 13, and supplies a digital image signal obtained as a result of the processing to the digital signal processing portion 15.

Under control of the CPU 23, the digital signal processing portion 15 performs necessary digital signal processing (for example, noise removal, white balance adjustment, color correction, edge enhancement, gamma correction and the like) on the digital image signal from the A/D conversion portion 14. Then, the digital signal processing portion 15 supplies the processed digital signal to the liquid crystal display panel 17 to display it.

(4) Display Processing of Live View Image

The digital signal processing portion 15 supplies moving image data from the A/D conversion portion 14 to the liquid crystal display panel 17. As a result, the liquid crystal display panel 17 displays a live view image obtained by capturing the subject within the imaging range. The live view image (moving image) is used when the user visually checks the imaging range, the angle of view, the state of the subject and the like, in order to capture a desired image.

(5) Compression Recording Processing

The imaging device 10 performs compression recording processing on the captured image. For example, in a moving image capture mode, when a moving image recording start instruction is input from the operation portion 24 or the touch panel 16, the CPU 23 controls the digital signal processing portion 15 and the recording device 19 to record moving image data. For example, when the user presses the REC button displayed on the touch screen 18, the digital signal processing portion 15 compresses the digital image signal from the A/D conversion portion 14, using a predetermined compression coding method, for example, the joint photographic experts group (JPEG) method. The digital signal processing portion 15 supplies the compressed digital image signal obtained as a result of the compression to the recording device 19 to record it. Further, in a still image capture mode, when the shutter button of the operation portion 24 or the touch panel 16 is pressed, the CPU 23 controls the digital signal processing portion 15 and the recording device 19 to record still image data. For example, when the user presses the shutter button displayed on the touch screen 18, a release signal is supplied from the touch panel 16 to the CPU 23. In response to the release signal, the CPU 23 controls the digital signal processing portion 15 to compress the still image data, and causes the recording device 19 to record the compressed still image data.

(6) Playback Processing

The imaging device 10 performs playback processing of the images recorded on the recording device 19. In a playback mode, when a playback instruction is input from the operation portion 24 or the touch panel 16, the CPU 23 controls the digital signal processing portion 15 and the recording device 19 to play back the image data recorded on the recording medium. For example, when the user presses a playback button displayed on the touch screen 18, the digital signal processing portion 15 expands the compressed image data recorded on the recording device 19, and supplies the obtained image data to the liquid crystal display panel 17 to display it.

(7) Various Setting Processing

The imaging device 10 performs setting processing of various types of functions included in the imaging device 10, based on a user input. For example, when the user presses a function setting button displayed on the touch screen 18, the CPU 23 causes the touch screen 18 to display a function setting screen corresponding to that button. Then, the function is set based on a user operation on the function setting screen. Examples of the functions of the imaging device 10 include a flash shooting function, a self-timer shooting function, a continuous shooting function, and an adjustment function for adjusting an image quality, a size, an exposure, a shutter speed, a white balance and the like of the image to be captured.

2. Functional Structure of Imaging Device

Figure 3:
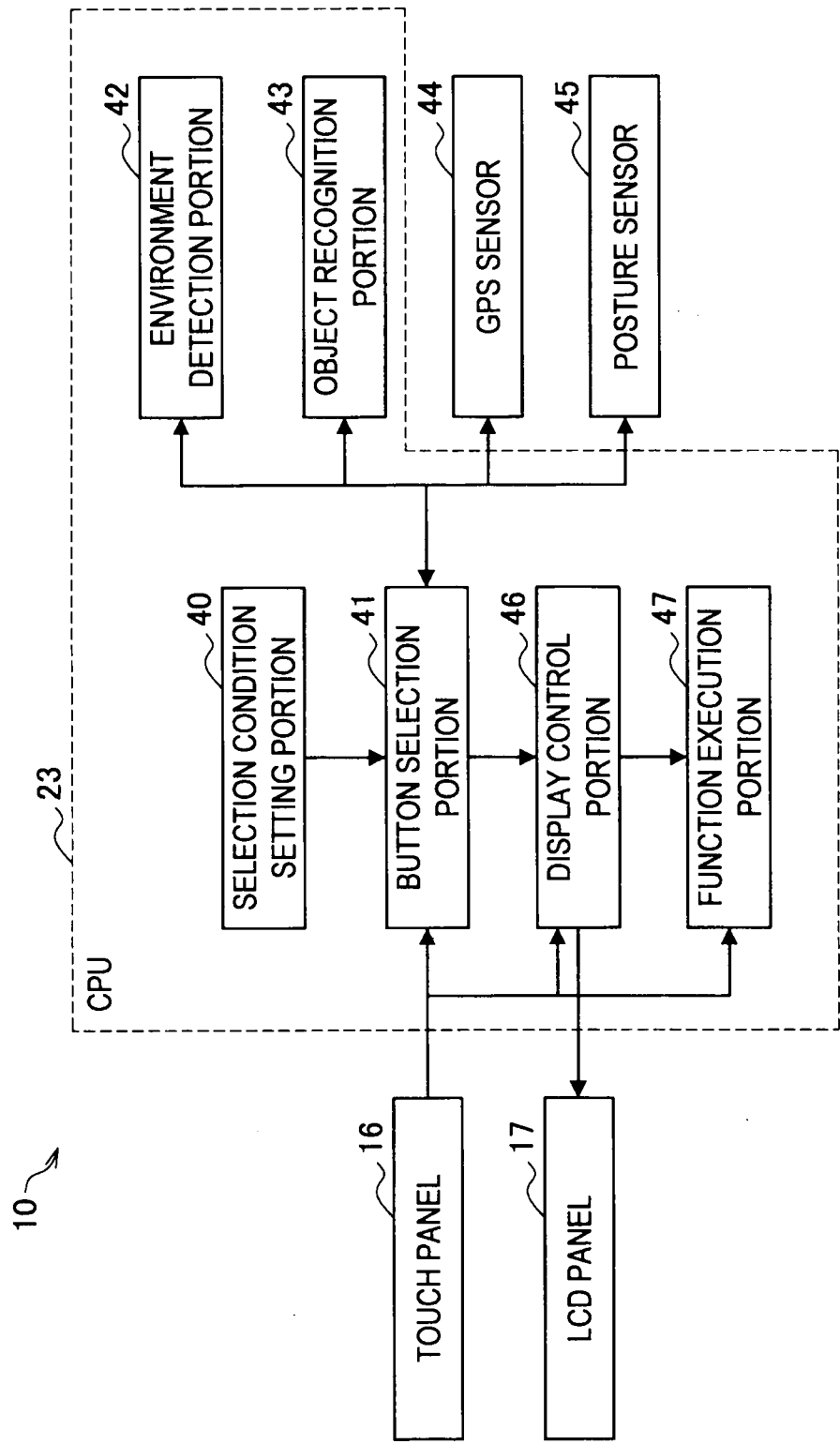
FIG. 3 is a block diagram showing a functional structure of the imaging device according to the present embodiment.

Next, a functional structure relating to display control of function buttons, which is a key feature of the imaging device 10 according to the present embodiment, will be described with reference to FIG. 3. FIG. 3 is a block diagram showing the functional structure of the imaging device 10 according to the present embodiment.

As shown in FIG. 3, the imaging device 10 includes a selection condition setting portion 40, a button selection portion 41, an environment detection portion 42, an object recognition portion 43, a global positioning system (GPS) sensor 44, a posture sensor 45, a display control portion 46 and a function execution portion 47. The functions of these portions are achieved by the CPU 23 shown in FIG. 1 executing the program stored in the ROM 26 or the like. However, the present invention is not limited to this example, and the functions of these portions may be achieved by dedicated hardware.

The selection condition setting portion 40 sets a selection condition for the button selection portion 41 (which will be described later) to select a function button. The selection condition setting portion 40 may set the selection condition based on a default setting condition, or may change the selection condition based on a user input. Alternatively, the selection condition setting portion 40 may dynamically change the selection condition based on an operation state and the like of the imaging device 10 so that the function button appropriate for the operation state can be selected.

Based on the selection condition set by the above-described selection condition setting portion 40, the button selection portion 41 selects at least one function button that corresponds to the operation state of the imaging device 10, from among a plurality of function buttons displayed on the display screen of the touch screen 18. Examples of the operation state of the imaging device 10 include an operation mode (the moving image capture mode, the still image capture mode, the playback mode, a menu mode, or an idle mode, for example) of the imaging device 10, a continuation time of the operation mode, a type or state of the screen that is being displayed in the operation mode, and a user operation state in the operation mode.

When the user specifies (taps, for example) a particular position on the display screen, the button selection portion 41 performs function button selection processing. More specifically, when the user specifies (taps using the operating body) the particular position on the display screen of the touch screen 18, the touch panel 16 detects the position specified on the display screen. Then, in response to the detection of the specified position by the touch panel 16, the button selection portion 41 selects, from among the plurality of function buttons displayed on the display screen, the function button appropriate for the operation mode of the imaging device 10 at the time of detection.

The button selection portion 41 can select the function button based on a chosen selection condition, as well as based on the operation state of the imaging device 10. For example, the button selection portion 41 may select the function button based on a selection condition, such as (a) a surrounding environment (for example, brightness, a particular kind of environment such as noise) of the imaging device 10, (b) an object (for example, a person) that is being displayed on the display screen, (c) a position (a tap position) on the display screen specified by the user, (d) an icon (a function button, a file etc.) specified by the user, (e) a current position or a current time, (f) a contact pressure or a contact time of the operating body, or (g) a posture (for example, an inclination, a direction) of the imaging device 10. Further, the button selection portion 41 may combine and use these selection conditions.

In order to provide the button selection portion 41 with the selection conditions in this manner, various types of sensors and detection portions are provided. The environment detection portion 42 has a function to detect the surrounding environment of the imaging device 10. The environment detection portion 42 is, for example, a sensor that detects brightness to adjust exposure, or a microphone that detects noise to cancel noise. The object recognition portion 43 uses a known object recognition function to recognize an object (a person, for example) in the captured image. The GPS sensor 44 communicates with an external device, and thereby obtains GPS information (latitude and longitude information) indicating the current position of the imaging device 10. The posture sensor 45 is formed by a gyro sensor, an acceleration sensor and the like, and detects the posture (inclination and acceleration in three axis directions, for example) of the imaging device 10.

The display control portion 46 controls the liquid crystal display panel 17, which is the display portion, so that a wide variety of images are displayed on the display screen of the liquid crystal display panel 17. For example, the display control portion 46 causes the function button selected by the above-described button selection portion 41 to move on the display screen from a default position such that the selected function button approaches the position (the tap position) on the display screen specified by the user. As a result, when the user taps the display screen, among the plurality of function buttons displayed on the display screen, the function button appropriate for the operation state of the imaging device 10 at the time of the tap moves closer to the tap position.

Based on the user operation, the function execution portion 47 executes the function specified by the user (image recording, playback, or various types of settings, for example). For example, when a recording button (the REC button or the shutter button) displayed on the touch screen 18 is pressed, the function execution portion 47 controls the recording device 19 to record, on the recording medium, the image that is being captured.

As described above, when the user taps the display screen, the imaging device 10 according to the present embodiment selects the function button appropriate for the operation state of the imaging device 10 at the time of the tap, and causes the function button to move on the display screen from the original position such that it approaches the tap position. Therefore, when the user taps the display screen of the touch screen 18, among the plurality of function buttons, only the function button appropriate for the operation state of the imaging device 10 moves closer to the tap position. As a result, the user can easily find the desired function button.

Figure 4:
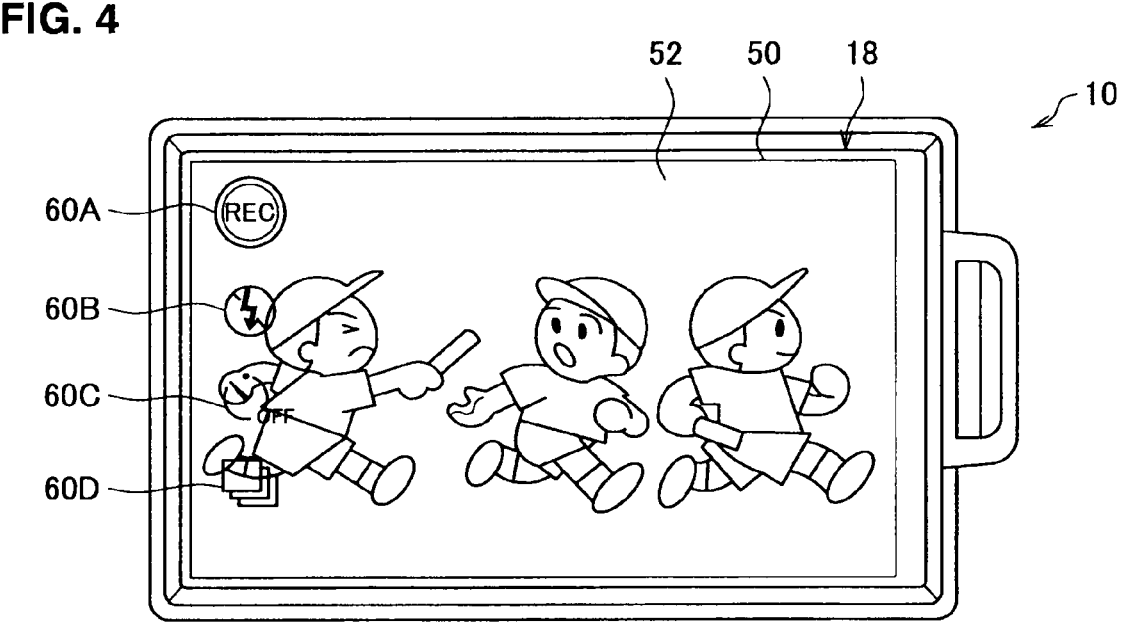
FIG. 4 is a diagram showing a display example of a display screen (before tap) according to the present embodiment.
Figure 5:
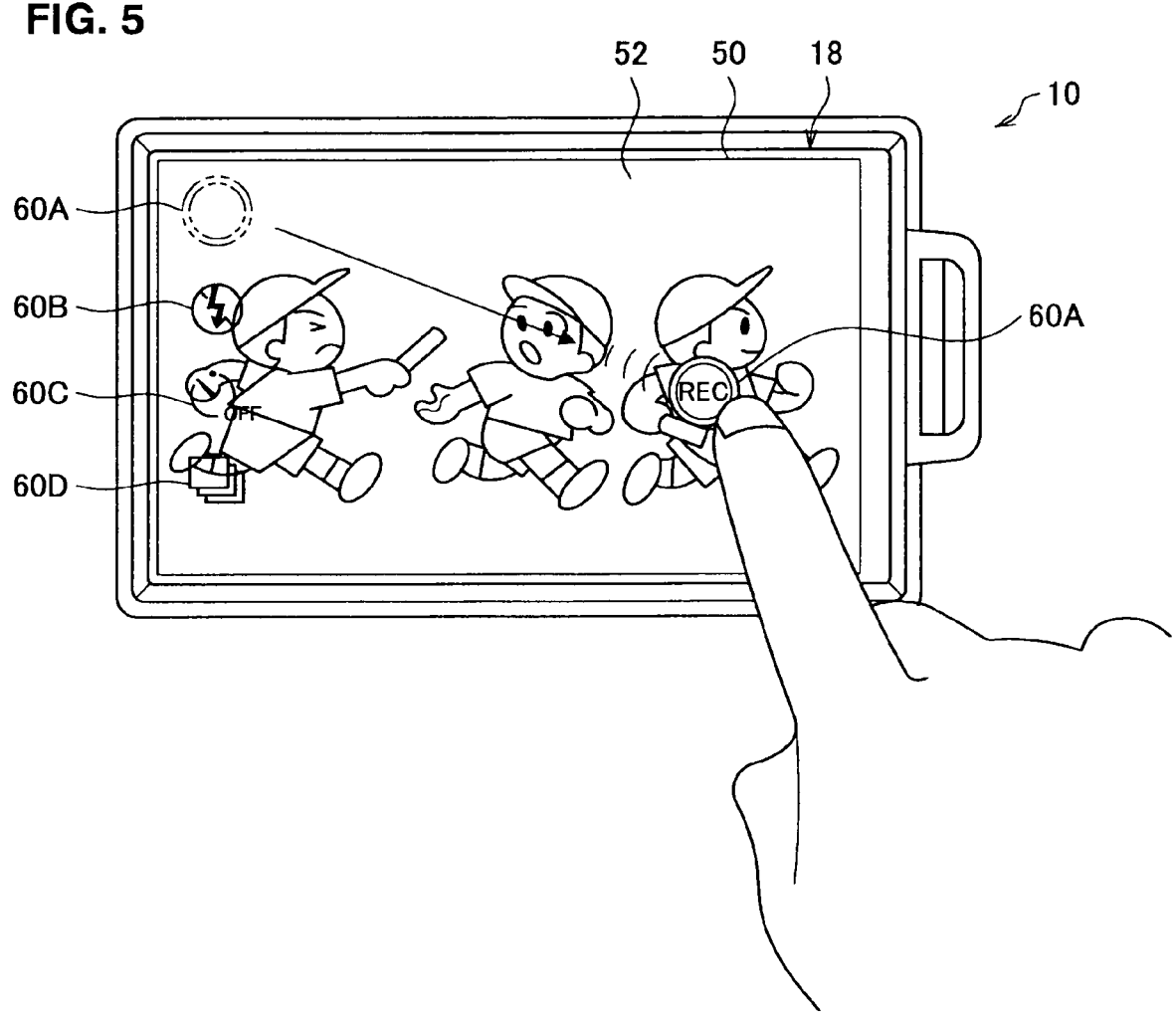
FIG. 5 is a diagram showing a display example of the display screen (after tap) according to the present embodiment.

Next, moving display of the function button according to the present embodiment will be described with reference to FIG. 4 and FIG. 5. FIG. 4 shows a display example of the display screen (before tap) of the touch screen 18 according to the present embodiment. FIG. 5 shows a display example of the display screen (after tap) of the touch screen 18 according to the present embodiment.

As shown in FIG. 4, when the operation mode of the imaging device 10 is an image capture mode, for example, a live view image 52 of the subject that is being captured by the imaging portion is displayed on a display screen 50 of the touch screen 18. A plurality of function buttons 60A to 60D (hereinafter, sometimes collectively referred to as "function buttons 60") that are used in the image capture mode are superimposed and displayed on the live view image 52. The function buttons 60 are graphical user interface (GUI) components, and they are displayed on the display screen 50 in order to perform the functions of the imaging device 10. Icons indicating features of the functions of the respective function buttons 60 are used.

In the example shown in FIG. 4, the four function buttons 60A to 60D are displayed on the left edge of the display screen 50. Of the four function buttons 60A to 60D, the REC button 60A is a function button to record the captured image. The REC button 60A may be a recording start button to start the recording of moving images, or may be a shutter button to record still images. The flash setting button 60B is a button to set a flash operation (Auto/Forced flash/No flash, for example). The self-timer setting button 60C is a button to set a self-timer operation (ON/OFF, a timer time, for example). The continuous shooting setting button 60D is a button to set an operation of continuous shooting and recording (ON/OFF, the number of still images) when a plurality of still images are continuously recorded.

In a recording standby state shown in FIG. 4, when the user records (i.e., releases) a still image or a moving image at a desired timing, the user may find the REC button 60A on the display screen 50 as in related art, and press the REC button 60A. However, depending on a situation, the user may not quickly find the desired REC button 60A from among the four function buttons 60 displayed on the display screen 50, or the REC button 60A may not be easily seen if it is superimposed on the subject in the live view image 52. In addition, since the REC button 60A is arranged on the left edge of the display screen 50, it is difficult for the user to press the REC button 60A with a finger on his/her right hand.

To address this, the imaging device 10 according to the present embodiment is designed such that, when the user specifies a particular position by tapping the display screen 50, the REC button 60A moves closer to the position (the tap position) on the display screen 50 specified by the user, as shown in FIG. 5.

More specifically, when the user wants to record the image in the state shown in FIG. 4, the user taps a particular position (the right edge in the example shown in FIG. 5) on the display screen 50 that is displaying the live view image 52, as shown in FIG. 5. The tap operation corresponds to specification of the position on the display screen 50. In response to this, the touch panel 16 of the imaging device 10 detects the tap operation of the user and the tap position (the specified position). Then, the button selection portion 41 selects, from among the four function buttons 60 displayed on the display screen 50, the function button 60 that corresponds to the operation state of the imaging device 10 at the time of the tap.

In the example shown in FIG. 5, the REC button 60A is selected, which is most frequently used in the image capture mode. Then, the display control portion 46 causes the selected REC button 60A alone to move from the default position (the position shown by the chain lines in FIG. 5) on the display screen 50 such that the REC button 60A gradually approaches the position (the tap position) specified by the user. Then, the display control portion 46 causes the REC button 60A to be stopped in the vicinity of the tap position (for example, slightly above the tap position). Since the REC button 60A is moved to a position that is slightly above the tap position, the moved REC button 60A is not hidden by the user's finger, which is convenient for the user.

As described above, in the present embodiment, when the user taps a particular position on the display screen 50, in response to this, the REC button 60A moves closer to the tap position on the display screen 50, and stops in the vicinity of the tap position. Therefore, in response to a user's action, it is possible to move only the REC button 60A that is appropriate for the operation state of the imaging device 10, to a position on the display screen 50 where the REC button 60A is easily recognized by the user. Accordingly, there is no need for the user to find the desired REC button 60A from among the plurality of function buttons 60 on the display screen 50. Thus, the user can easily find the desired REC button 60A regardless of the situation. In addition, the user can easily press, using a finger on his/her right hand, the REC button 60A that has moved closer to the right edge of the display screen 50, and can record an image at a desired recording timing without hand movement.

Note that, in the example shown in FIG. 5, the live view image 52 is displayed full screen on the display screen 50, and the function buttons 60 are superimposed and displayed on the live view image 52. However, the present invention is not limited to this example. For example, the display screen 50 in the image capture mode may be divided into a display area for the live view image 52 and a display area for the function buttons 60. Also in this case, it can be ensured that, when the user taps the display screen 50, the function button 60 that is appropriate at that time moves closer to the tap position.

Further, in the example shown in FIG. 5, when image recording is possible in the image capture mode, on the assumption that the user wants to perform a recording action, only the REC button 60A that is frequently used in the image capture mode is set such that it moves closer to the tap position. However, the present invention is not limited to this example. For example, when it is desired that one of the other function buttons 60B to 60D moves closer to the tap position, the user may register, in advance in the imaging device 10, the desired function button 60 that is moved closer to the tap position in the image capture mode. In this case, it is possible to cause any one of the function buttons 60 that is frequently used (for example, the flash setting button 60B) to move closer to the tap position. Further, a surrounding environment (brightness, a movement speed of the subject, a focus distance) or a user's action may also be detected, and the function button 60 (for example, the flash setting button 60B, the continuous shooting setting button 60D, or various types of setting buttons for setting an exposure, a shutter speed, and the like) that is appropriate for the surrounding environment or the user's action may be moved closer to the tap position. Note that the number of the function buttons 60 to be moved closer to the tap position is not limited to one. A plurality of the function buttons 60 that correspond to the operation state of the imaging device 10 at the time of the tap and another selection condition may be moved closer to the tap position.

In the example described above, the user presses the function button 60 that has moved closer to the tap position, and the function of the function button 60 is performed. In addition to this, the user may delete the function button 60 from the display screen 50 by dragging and dropping, to a trash icon, the function button 60 that has moved closer to the tap position. Further, the user may change an arrangement position of the function button 60 that has moved closer to the tap position to a desired position on the display screen 50, by dragging and dropping the function button 60 to the desired position.

3. Flow of Display Method

Figure 6:
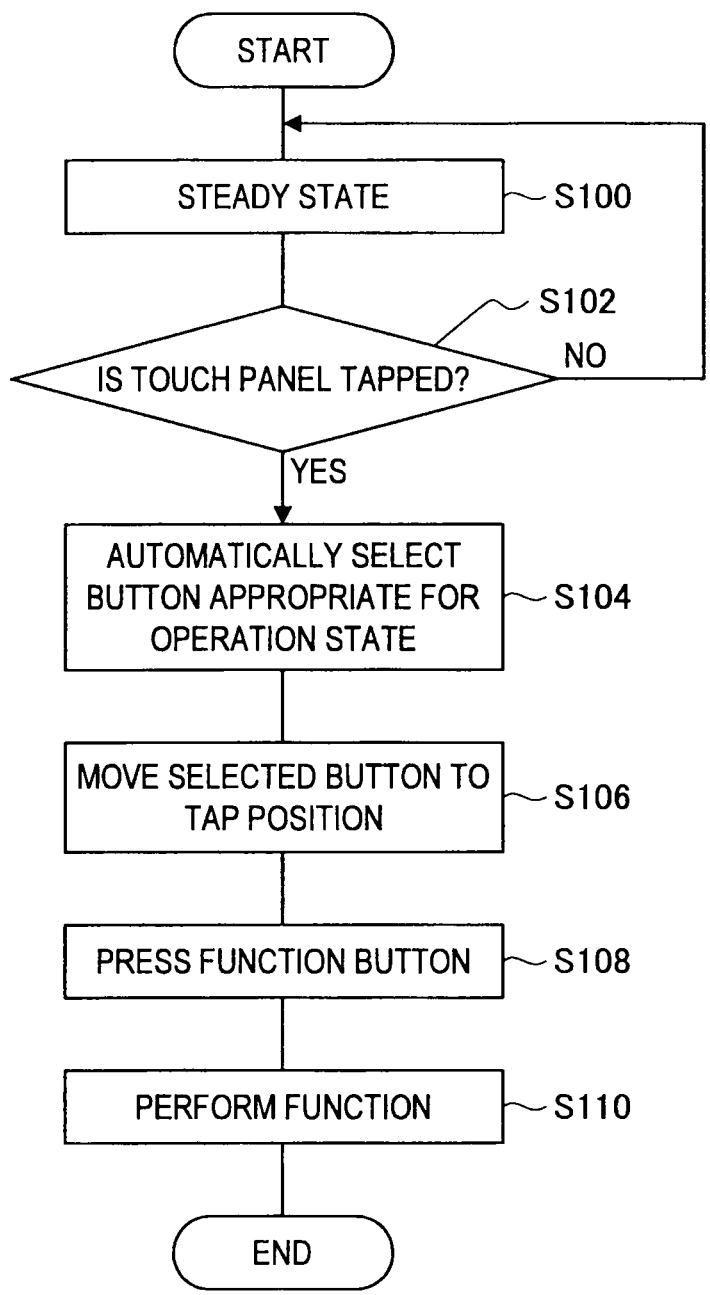
FIG. 6 is a flowchart showing a method of displaying function buttons according to the present embodiment.

Next, a method of displaying the function buttons 60 by the imaging device 10 according to the present embodiment will be described with reference to FIG. 6. FIG. 6 is a flowchart showing the method of displaying the function buttons 60 according to the present embodiment.

As shown in FIG. 6, when the imaging device 10 is in a steady state in a given operation mode, a plurality of the function buttons 60 that are used in that operation mode are displayed in their default positions on the display screen 50 (step S100). For example, as shown in FIG. 4, when the operation mode of the imaging device 10 is the image capture mode, the four function buttons 60 used in the imaging device 10 are aligned and displayed in their default positions (at the left edge of the screen). Further, although not shown in the figures, when the operation mode of the imaging device 10 is the playback mode, a plurality of the function buttons 60 (for example, a playback button, a deletion button, a frame advance button for moving images and a rotation/enlargement function button) that are used in the playback mode are displayed in their default positions.

When the imaging device 10 structured as described above is in the steady state, the touch panel 16 detects whether or not the operating body touches or approaches a particular position on the display screen 50 (for example, whether or not the user taps the display screen 50 with a finger) (step S102).

When the user taps the display screen 50 and thereby specifies the particular position on the display screen 50, the imaging device 10 automatically selects, from among the plurality of function buttons 60 that are being displayed on the display screen 50, the function button 60 that is appropriate for the operation state at the time of the tap (step S104). For example, in the example shown in FIG. 5, the imaging device 10 is in the image capture mode. Therefore, the REC button 60A that is appropriate for the image capture mode is selected from among the function buttons 60A to 60D.

Then, the imaging device 10 causes the function button 60 selected at step S104 to move from the default position on the display screen 50 to the tap position such that it gradually approaches the position (the tap position) specified at step S102 by the user (step S106). For example, in the example shown in FIG. 5, the REC button 60A moves from the default position at the upper left corner of the screen to the tap position at the center of the right edge.

As described above, when the user taps the display screen 50 (step S102), a predetermined one of the function buttons 60 moves closer to the tap position depending on the operation state of the imaging device 10 (step S106). As a result, the user can easily find the predetermined one of the function buttons 60.

After that, when the user presses the function button 60 that has moved closer to the tap position at step S106 described above (step S108), the touch panel 16 detects that the function button 60 has been specified by the user, and the imaging device 10 performs the function corresponding to the function button 60 (step S110). For example, in the example shown in FIG. 5, when the REC button 60A that has moved closer to the tap position is pressed, the moving image or the still image that is captured at that time is recorded on the recording medium.

The flow of the display method according to the present embodiment is described above. With the display method according to the present embodiment, the plurality of function buttons 60 are displayed in their default positions in the steady state of the imaging device 10. When the touch panel 16 is tapped, an appropriate one of the function buttons 60 that corresponds to the operation state of the imaging device 10 at that time is moved and displayed on the display screen 50 such that it approaches the tap position. As a result, the user can easily find the desired function button 60 on the display screen 50.

4. Specific Examples of Display Screen

Next, specific examples will be described for a case where the function button is automatically selected based on various setting conditions and the selected function button is moved on the display screen 50.

(1) Button Selection Based Only on Operation State of the Imaging Device 10

As described above, the button selection portion 41 of the imaging device 10 selects the function button 60 that is caused to move on the display screen 50, based on the operation state of the imaging device 10. At this time, the function button 60 that is appropriate for the operation state may be selected using only the operation state of the imaging device 10 as a selection condition, without using an additional selection condition.

For example, when the operation mode of the imaging device 10 is the image capture mode and the captured image (the live view image 52) is displayed on the display screen 50, if the display screen 50 is tapped, the imaging device 10 selects and moves the REC button 60A (the shutter button) as shown in FIG. 5. As a result, the user can quickly start recording without having to find the REC button 60A within the display screen 50. Generally in the image capture mode, the REC button 60A is moved unconditionally in this manner. However, the present invention is not limited to this example. For example, in order to meet the needs of each user, a given one (or more) of the function buttons 60 (the flash setting button 60B, a macro image capture setting button etc.) that is registered in advance for each user may be moved.

When the operation mode of the imaging device 10 is the playback mode, if the played back image displayed on the display screen 50 is tapped, the imaging device 10 may move a deletion button to delete the image that is being played back, and a mode change button to return to the image capture mode from the playback mode. Further, in the playback mode, in order to check blurring of the played back image, an enlargement button to enlarge and display the played back image may be moved. In this manner, in the playback mode, the function button 60 that is appropriate to edit the played back image is moved in response to the tap by the user. Thus, user-friendliness is enhanced.

(2) Button Selection Based on Surrounding Environment

Next, an example will be described in which the function button 60 is selected and moved in a case where the function button 60 corresponds to an operation state of the imaging device 10, and also corresponds to a surrounding environment of the imaging device 10. The environment detection portion 42 of the imaging device 10 detects the surrounding environment of the imaging device 10. Then, the button selection portion 41 of the imaging device 10 selects the function button 60 to be moved on the display screen 50, based on the operation state and the surrounding environment of the imaging device 10. More specifically, when a special environment is detected by the environment detection portion 42, the imaging device 10 selects the function button 60 that is necessary to address the special environment, and moves the selected function button 60 on the display screen 50. For example, when the surrounding environment is too bright, the imaging device 10 moves the function button 60 relating to an exposure correction function. Further, when the subject that is being captured moves rapidly, the imaging device 10 moves the function button 60 relating to a continuous shooting function (the continuous shooting setting button 60D in FIG. 4, for example). As a result, when the surrounding environment of the imaging device 10 is a special environment, the function button 60 that is appropriate for the special environment is moved closer to the tap position. Thus, it is possible to recommend the user to perform the function of the function button 60.

(3) Button Selection Based on Object Being Displayed

Next, an example will be described in which the function button 60 is selected and moved in a case where the function button 60 corresponds to an operation state of the imaging device 10, and also corresponds to an object that is being displayed on the display screen 50. The object recognition portion 43 of the imaging device 10 recognizes the object that is being displayed on the display screen 50. Then, the button selection portion 41 of the imaging device 10 selects the function button 60 to be moved on the display screen 50, based on the operation state of the imaging device 10 and the object. More specifically, when a particular object (for example, a person that is a subject) within the image displayed on the display screen 50 is recognized by the object recognition portion 43, the imaging device 10 selects the function button 60 that corresponds to the object, and moves the selected function button 60 on the display screen 50.

Figure 7:
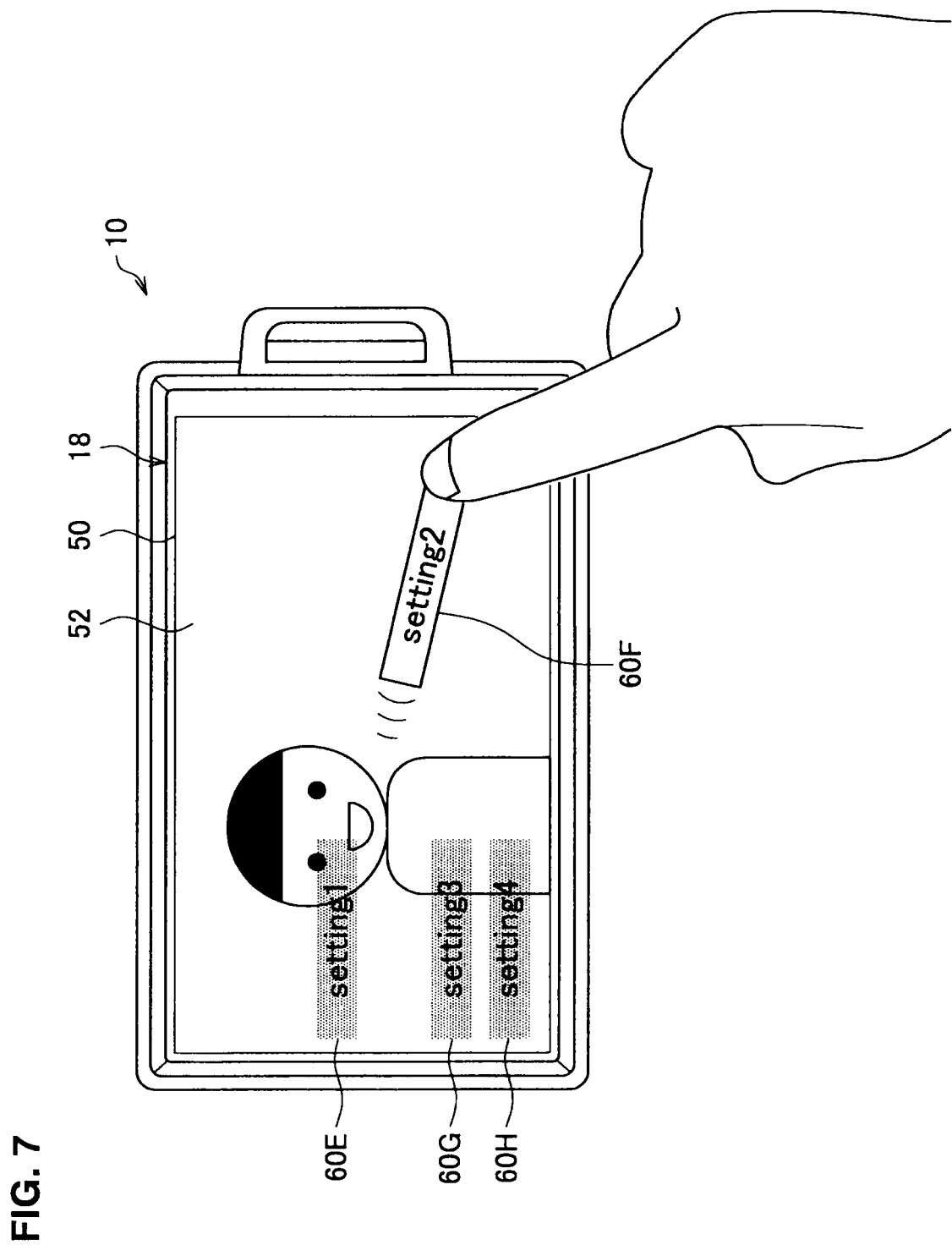
FIG. 7 is a diagram showing a display example in which a function button is moved, the function button corresponding to a person displayed on the display screen according to the present embodiment.

FIG. 7 shows a display example in which the function button 60 that corresponds to the person displayed on the display screen 50 is moved. As shown in FIG. 7, in the image capture mode, the live view image 52 that is being captured by the imaging device 10 is displayed on the display screen 50. When a particular user A is included in the live view image 52, if the user taps the display screen 50, a function button 60F relating to the user A moves closer to the tap position. The function button 60F is a button to display information relating to the user A (name, age, etc.) that has been registered in advance, for example. If the user moves the function button 60 that corresponds to the recognized object in this manner, the user can easily and quickly press the function button 60F relating to the object that is being captured.

Further, as another example in which object recognition is used, the function button 60 to set (turn on/off) a smile shutter function may be moved when an image of a particular person is included in the live view image 52 that is being captured. In this case, when a person is within the imaging range, the user can immediately turn on the smile shutter function by pressing the function button 60 that has moved closer to the tap position. Thus, it is possible to prevent missing out on a shutter chance to capture the smile of the person. Note that the smile shutter function is a function that automatically releases the shutter when the imaging device 10 detects a person's smile.

(4) Button Selection Based on Tap Position on Display Screen

Next, an example will be described in which the function button 60 is selected and moved in a case where the function button 60 corresponds to an operation state of the imaging device 10, and also corresponds to a position (a tap position) on the display screen 50 specified by the user using an operating body. The touch panel 16 of the imaging device 10 detects the tap position on the display screen 50. Then, the button selection portion 41 of the imaging device 10 selects the function button 60 to be moved on the display screen 50, based on the operation state of the imaging device 10 and the tap position. More specifically, areas on the display screen 50 and the function buttons 60 are associated with each other in advance. When the user specifies a particular position by tapping the display screen 50, the imaging device 10 identifies the area on the display screen 50 that includes the position (the tap position) specified by the user, and moves the function button 60 that corresponds to the identified area to the tap position. As a result, depending on the tap position, a different one of the function buttons 60 moves closer to the tap position.

Figure 8:
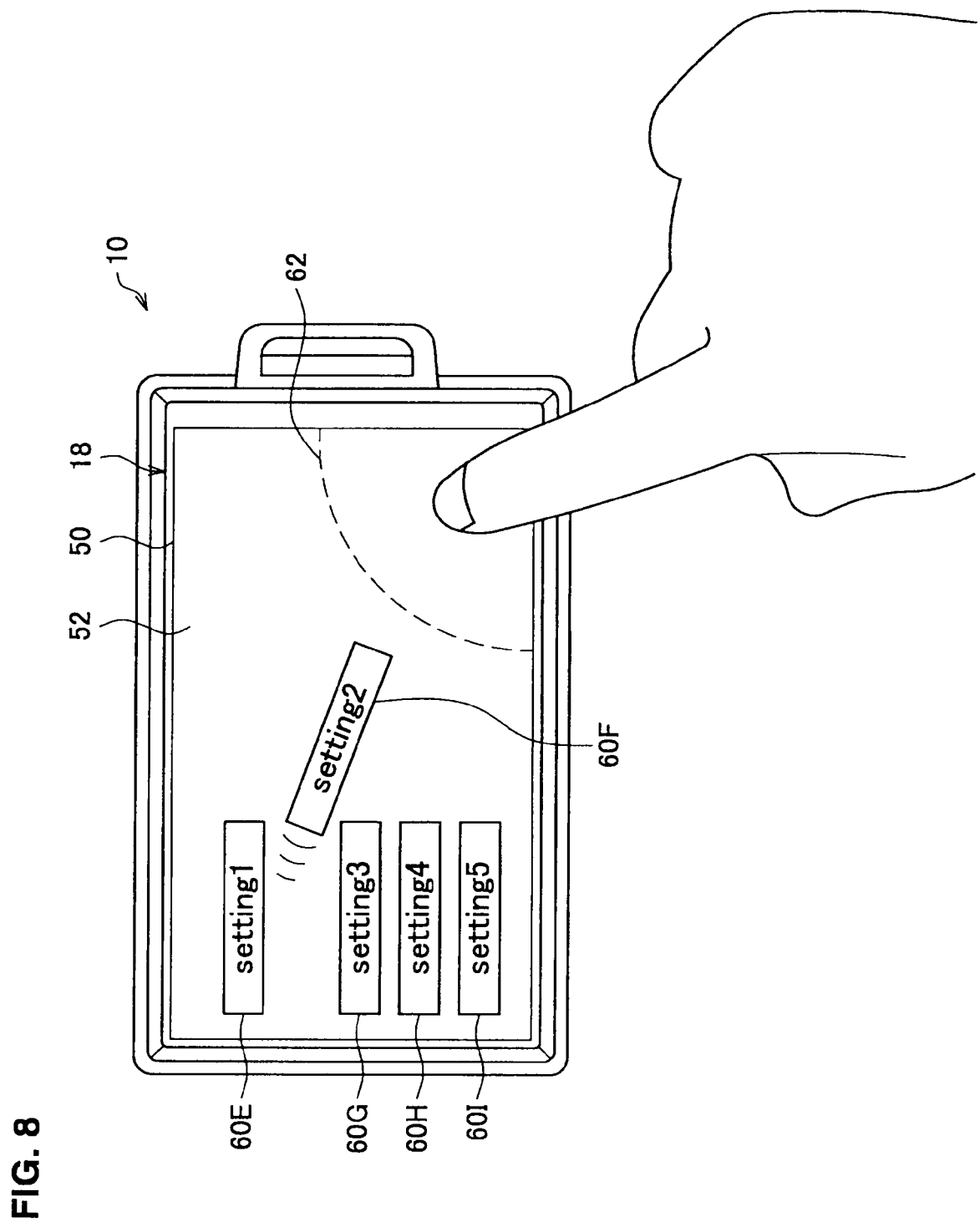
FIG. 8 is a diagram showing a display example in which a function button is moved, the function button corresponding to a tap position on the display screen according to the present embodiment.

FIG. 8 shows a display example in which the function button 60 that corresponds to the tap position on the display screen 50 is moved. As shown in FIG. 8, when the user taps a predetermined area (for example, a lower right screen area 62) within the display screen 50, the function button 60F that corresponds to the area 62 moves closer to the tap position. The function button 60F is a button to set a function relating to image capture, for example. If the function button 60 corresponding to the tap position is moved in this manner, the user can easily specify a necessary one of the function buttons 60 by changing the tap position on the display screen 50.

(5) Button Selection Based on Icon Specified On Display Screen

Next, an example will be described in which the function button 60 is selected and moved in a case where the function button 60 corresponds to an operation state of the imaging device 10, and also corresponds to an icon displayed at a position on the display screen 50 specified by the user using an operating body. The touch panel 16 of the imaging device 10 detects the tap position on the display screen 50. Then, the button selection portion 41 of the imaging device 10 selects the function button 60 to be moved on the display screen 50, based on the operation state of the imaging device 10 and the icon displayed at the tap position. More specifically, when the user specifies an icon (for example, a chosen one of the function buttons 60, an icon indicating a file, or the like) on the display screen 50, the imaging device 10 selects the function button 60 that relates to the icon, and moves the selected function button 60 on the display screen 50.

Figure 9:
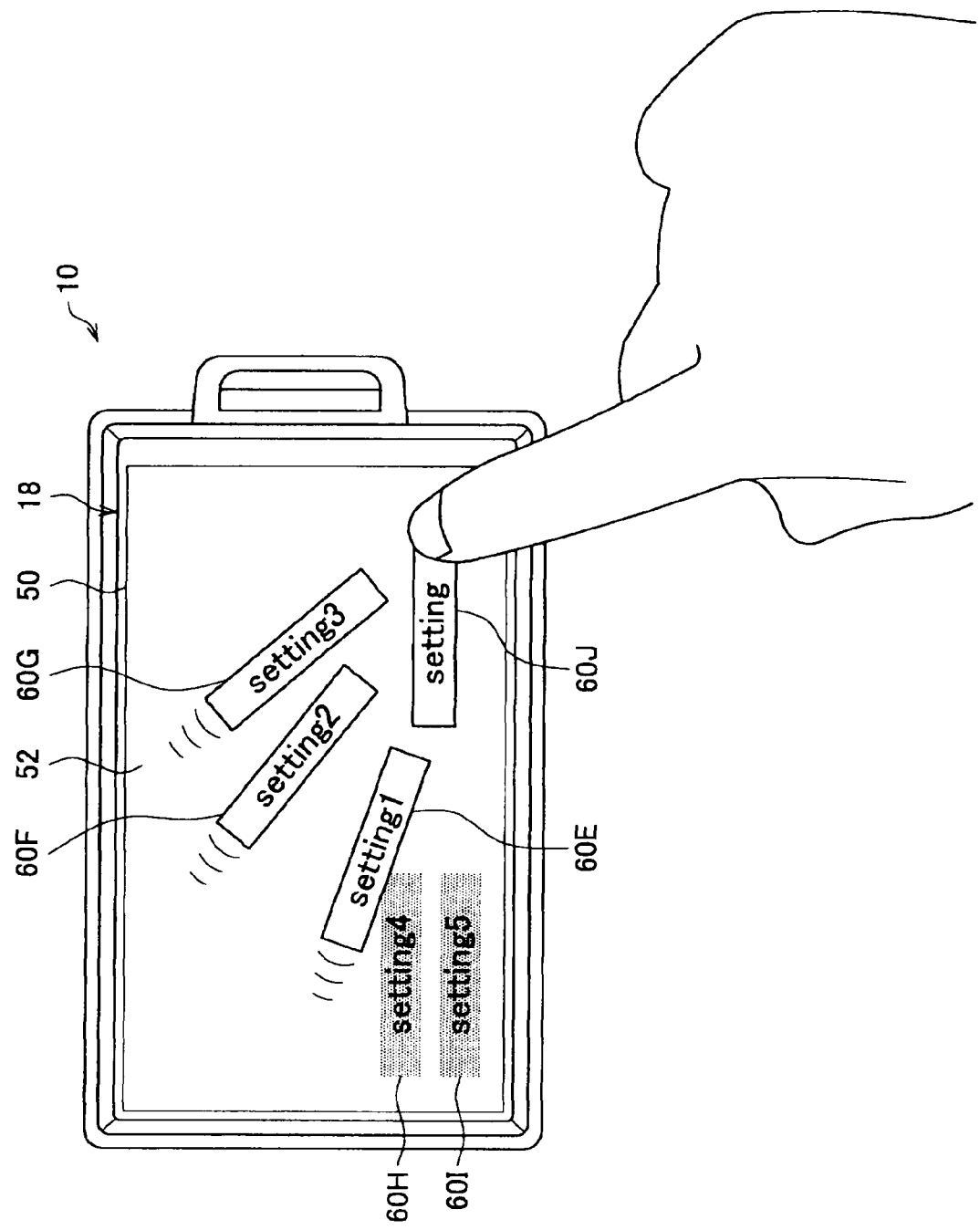
FIG. 9 is a diagram showing a display example in which a function button is moved, the function button corresponding to an icon displayed at a tap position on the display screen according to the present embodiment.

FIG. 9 shows a display example in which the function button 60 that corresponds to an icon (a function button 60J) displayed at the tap position on the display screen 50 is moved. For example, the icon may be an icon indicating the above-described function button 60, or may be an icon indicating a given data file of images, audio or the like. As shown in FIG. 9, when the user taps a particular icon displayed on the display screen 50, for example, the function button 60J, three function buttons 60E, 60F and 60G that have a similar function to that of the function button 60J move closer to the function button 60J. For example, when the function button 60J is a button relating to an exposure adjustment function of the captured image, the other function buttons 60E to 60G are buttons each relating to an adjustment function of contrast, sharpness, shutter speed or the like of the captured image. If the other function buttons 60E to 60G that relate to the particular function button 60J that is specified by the user are moved in this manner, the user can easily find the related function buttons 60.

Further, as another example, when the user specifies an icon of an image file on the display screen 50, the function button 60 relating to the specified icon may be moved.

For example, when the operation mode of the imaging device 10 is the playback mode, if the user taps a corner of a still image itself or a corner of the icon of the still image file, the function button 60 having a function to rotate or enlarge the still image may be moved closer to the tap position. The user can easily associate the tap of the corner of the image or the icon with an image rotation function or an image enlargement function. In this manner, if the function button 60 having a function that is likely to be associated with the tap position on the image or the icon is moved closer to the tap position, user-friendliness is enhanced.

Further, in the playback mode, when the user taps an icon of a moving image file displayed on the display screen 50, a moving image playback button may be moved closer to the tap position. Consequently, the user can easily find the moving image playback button of the moving image, by simply specifying the moving image file to be played back.

Further, in a communication mode in which the imaging device 10 and an external device communicate with each other, when the user taps an icon of an image file on the display screen 50, a transmission button to transmit the image file to the external device may be moved closer to the tap position. In this case, the user can easily find the transmission button of the image file, by simply specifying the image file to be transmitted.

(6) Button Selection Based on Current Position or Current Time

Next, an example will be described in which the function button 60 is selected and moved in a case where the function button 60 corresponds to an operation state of the imaging device 10, and also corresponds to a current position and/or a current time of the imaging device 10. The GPS sensor 44 of the imaging device 10 acquires current position information of the imaging device 10, and a timer (not shown in the figures) acquires a current time. Then, the button selection portion 41 of the imaging device 10 selects the function button 60 to be moved on the display screen 50, based on the operation state of the imaging device 10 and on the current position and/or the current time of the imaging device 10. More specifically, when the user taps a particular position on the display screen 50, the imaging device 10 moves the function button 60 that is appropriate for the current position and/or the current time of the imaging device 10.

Figure 10:
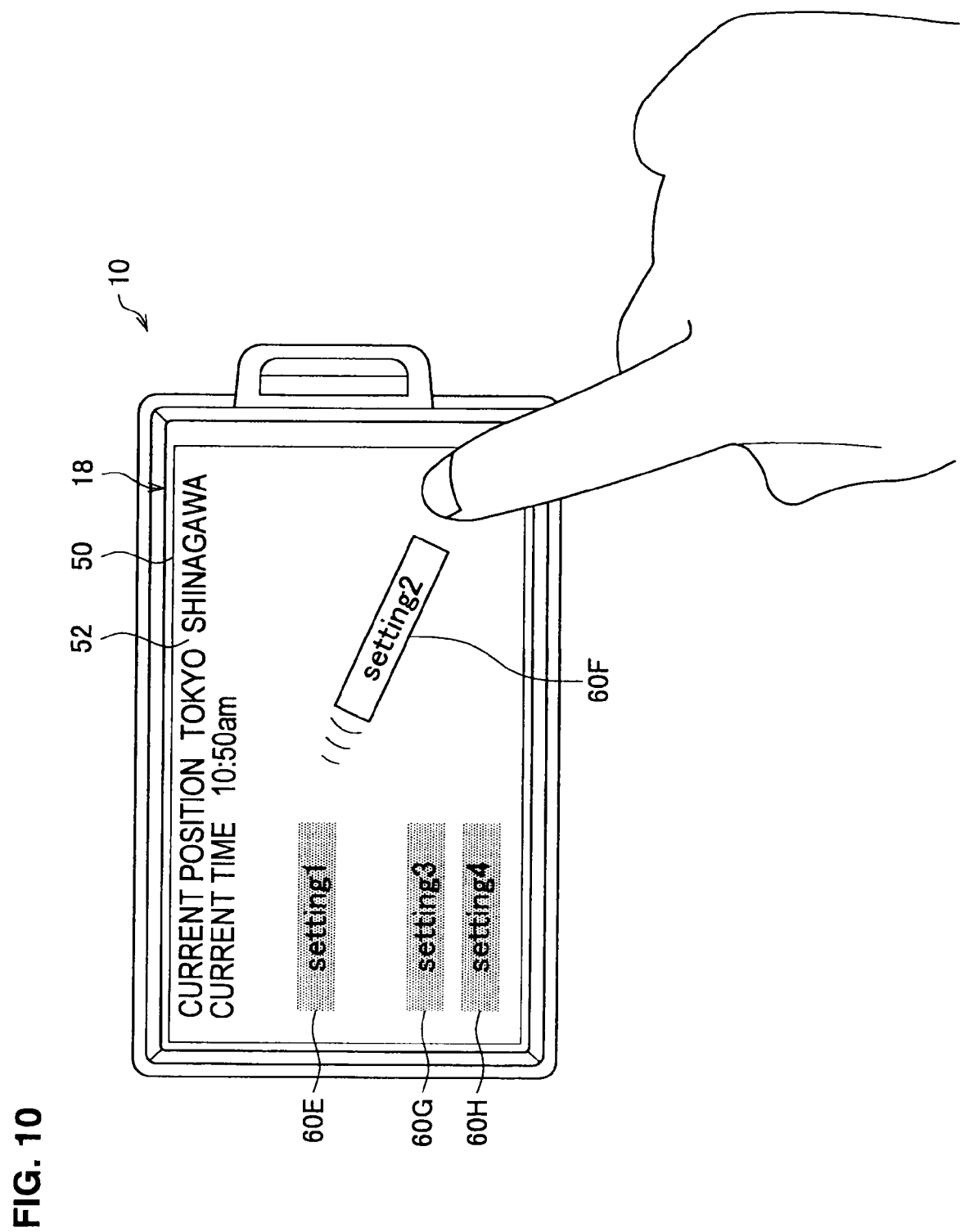
FIG. 10 is a diagram showing a display example in which a function button is moved, the function button corresponding to a current position and a current time of the imaging device according to the present embodiment.

FIG. 10 shows a display example in which the function button 60 that corresponds to the current position and the current time of the imaging device 10 is moved. As shown in FIG. 10, when a user at Shinagawa in Tokyo taps a certain position within the display screen 50 during the forenoon, the function button 60F that relates to the current position and the current time moves closer to the tap position. The function button 60F is, for example, a setting button to set information relating to Tokyo, or a button to set the operation of the imaging device 10 during the forenoon. If the function button 60 that corresponds to the current position and/or the current time of the imaging device 10 is moved in this manner, the user can easily find the function button 60 that is appropriate for the current position and/or the current time.

(7) Button Selection Based on Contact Pressure or Contact Time of the Operating Body Next, an example will be described in which the function button 60 is selected and moved in a case where the function button 60 corresponds to an operation state of the imaging device 10, and also corresponds to a contact pressure and/or a contact time of the operating body on the display screen 50. A pressure sensitive sensor (not shown in the figures) included in the touch panel 16 of the imaging device 10 detects a contact pressure (a pressing force) when the operating body depresses the display screen 50, and/or a contact time from the start of the contact to the end of the contact. Then, the button selection portion 41 of the imaging device 10 selects the function button 60 to be moved on the display screen 50, based on the operation state of the imaging device 10 and on the above-described contact pressure and/or the contact time. More specifically, when the user taps a particular position on the display screen 50, the imaging device 10 moves the function button 60 that corresponds to the contact pressure and/or the contact time.

Figure 11:
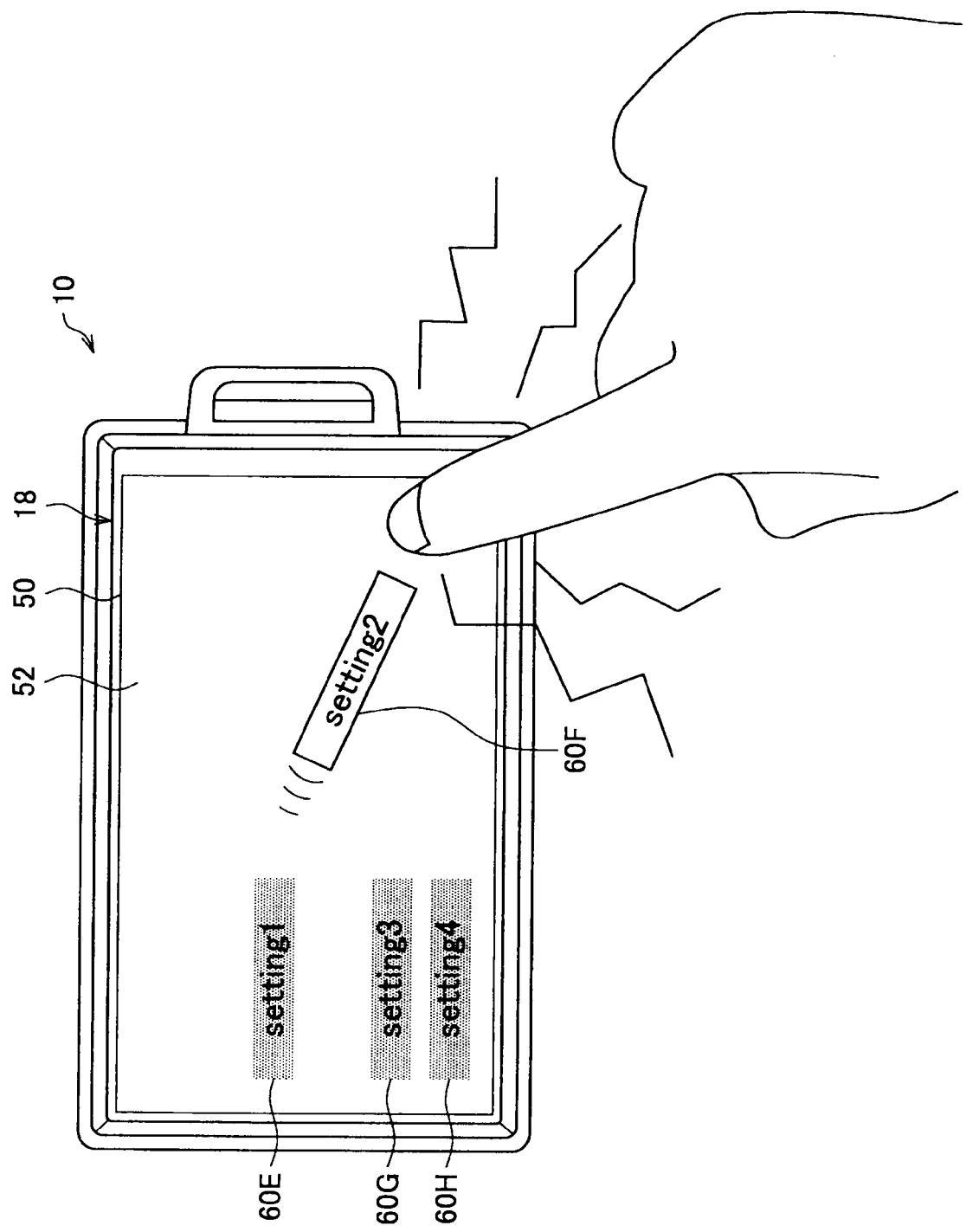
FIG. 11 is a diagram showing a display example in which a function button is moved, the function button corresponding to a contact pressure of an operating body on the display screen according to the present embodiment.

FIG. 11 shows a display example in which the function button 60 that corresponds to the contact pressure of the operating body on the display screen 50 is moved. As shown in FIG. 11, depending on the pressing force (the contact pressure) when the user taps the display screen 50, a different one of the function buttons 60 moves closer to the tap position. For example, when the user presses the display screen 50 with a pressing force larger than a predetermined pressure, the function button 60F moves closer to the tap position, and when the user presses the display screen 50 with a pressing force smaller than the predetermined pressure, another function button 60E moves closer to the tap position. For example, if contact pressures and the function buttons 60 are associated and registered, the user can easily specify the function button 60 to be moved closer to the tap position, by adjusting the pressing force on the display screen 50. Note that FIG. 11 shows an example in which the contact pressure of the operating body is used as a selection condition of the function button 60. However, in a similar manner, the contact time (touch continuation time) of the operating body may be used as a selection condition of the function button 60 so that a different one of the function buttons 60 approaches depending on the contact time.

(9) Button Selection Based on Posture of the Imaging Device 10

Next, an example will be described in which the function button 60 is selected and moved in a case where the function button 60 corresponds to an operation state of the imaging device 10, and also corresponds to a posture of the imaging device 10. The posture sensor 45 (such as a gyro sensor or an acceleration sensor) of the imaging device 10 detects the posture of the imaging device 10 when the user taps the display screen 50. Then, the button selection portion 41 of the imaging device 10 selects the function button 60 to be moved on the display screen 50, based on the operation state of the imaging device 10 and the detected posture of the imaging device 10. More specifically, when the user taps a certain position on the display screen 50 with the imaging device 10 inclined, the imaging device 10 moves a particular one of the function buttons 60 that corresponds to the inclination.

Figure 12:
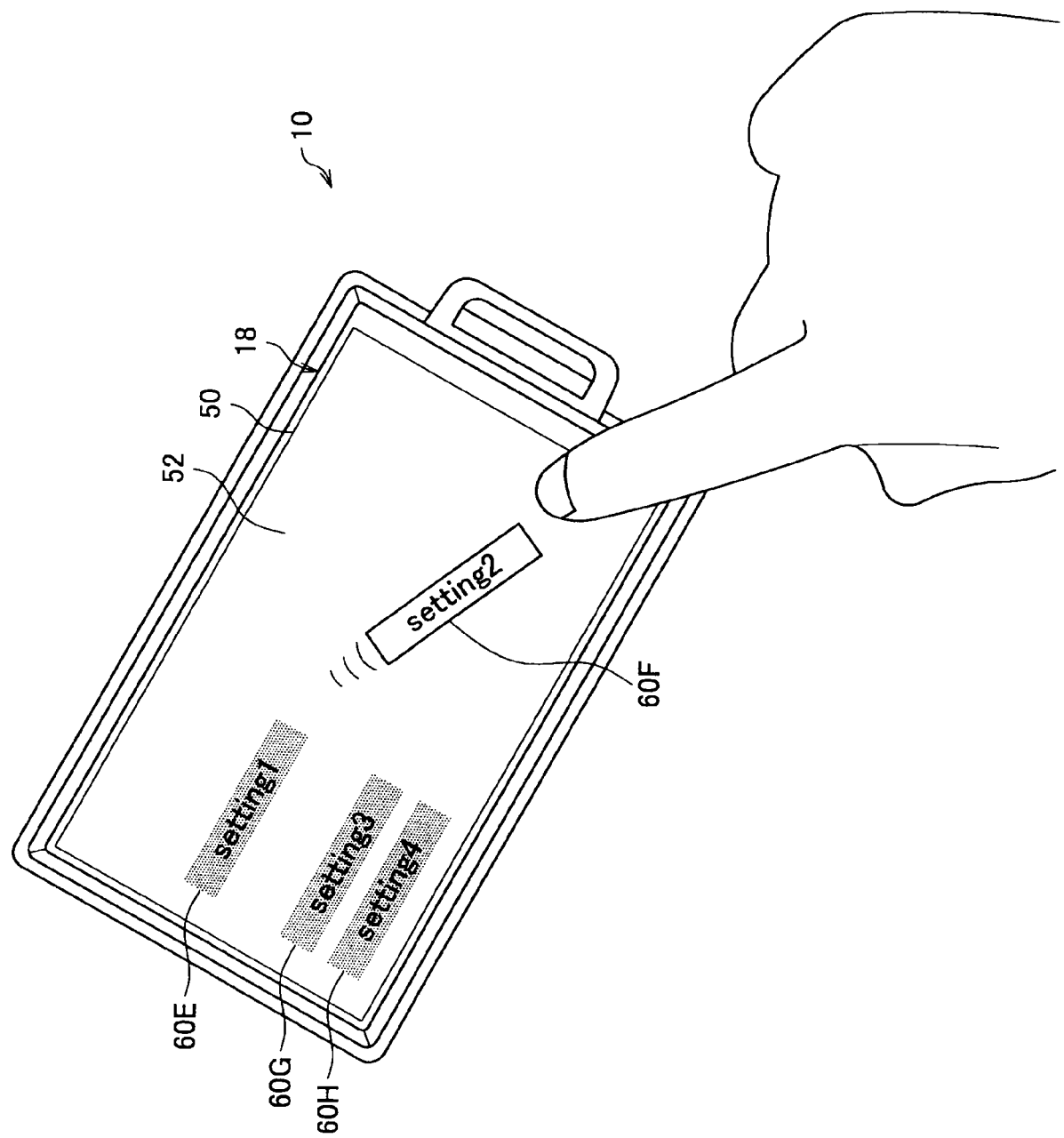
FIG. 12 is a diagram showing a display example in which a function button is moved, the function button corresponding to a posture of the imaging device according to the present embodiment.

FIG. 12 shows a display example in which the function button 60 that corresponds to the posture of the imaging device 10 is moved. As shown in FIG. 12, when the user captures an image by arranging the imaging device 10 in a vertical direction (during vertical shooting) or when the user captures an image by inclining the imaging device 10, if the user taps a particular position within the display screen 50, the function button 60F that is appropriate for the inclined posture moves closer to the tap position. The function button 60F is, for example, a dedicated function button for vertical shooting, or a button to rotate an image. Thus, in the image capture mode, when the user captures an image by inclining the posture of the imaging device 10, the function button 60 that is appropriate for an imaging operation in that posture moves closer to the tap position. Therefore, user-friendliness is enhanced.

Also in the playback mode, the function button 60 may be selected and moved depending on the posture of the imaging device 10. For example, in a still image playback mode, when the imaging device 10 is inclined to the left or to the right, the function button 60 that allows frame-by-frame advance of played back images to the previous or next image may be moved closer to the tap position. On the other hand, in a moving image playback mode, when the imaging device 10 is inclined to the left or to the right, the function button 60 that allows rewind or fast-forward of played back moving images may be moved closer to the tap position. In this manner, a different one of the function buttons 60 can be moved depending on the direction in which the imaging device 10 is inclined. If the function button 60 is moved closer to the tap position depending on the posture (the inclination or the direction) of the imaging device 10 in the manner described above, the user can intuitively specify a desired one of the function buttons 60, which is convenient.

5. Other Embodiments

The examples in which the information processing device of the present invention is applied to the imaging device 10 are described above. However, the present invention is not limited to these examples. The information processing device of the present invention can be applied to a given electronic device as long as the electronic device is provided with a display portion and a position detection portion (for example, the touch panel 16) that detects a position on the display screen of the display portion. For example, the information processing device of the present invention can be applied to a video/audio player (portable type, on-board type, etc.), a car navigation device, a personal computer, a mobile phone, a personal digital assistant (PDA), a portable game console, a television receiver, an optical disc player/recorder, a digital photo frame, an automatic teller machine (ATM), a kiosk terminal, an information communication terminal such as a POS terminal, an automatic vending machine, and the like.

Hereinafter, embodiments other than the imaging device 10 will be described as examples. Note that it is assumed that electronic devices described below are also provided with the functional structure shown in FIG. 3.

(1) Example Applied to Audio Player

First, an embodiment will be described in which the information processing device of the present invention is applied to a recording playback device, particularly, to a portable music player. Recently, a portable digital music player including a display portion (for example, the liquid crystal display panel 17), the touch panel 16 and the like has become widely used. This type of music player records music data on a recording medium and plays back the recorded music data. Many icons (including the function buttons 60) are also displayed on the display screen 50 of the music player. When the user presses one of the function buttons 60 on the display screen 50, the user can cause the music player to perform a specific function.

A music playback screen is displayed on the display screen 50 of the music player. The music playback screen is used, for example, to select music to be played back, and to display images that are being played back. When the user taps the display screen 50 of the music player during music playback, the music player selects, based on its operation state and another selection condition, the function button 60 that is appropriate for the operation state and the like.

For example, let us consider a case in which the operation mode of the music player is a music playback mode, and the user taps the display screen 50 while playback is stopped. In this case, the music player selects a playback button as the function button 60 that corresponds to the operation state (while playback is stopped), and causes the playback button to move closer to the tap position. As a result, the user can easily find the playback button and can start playback of a desired piece of music. On the other hand, when the user taps the display screen 50 during playback in the music playback mode, the music player selects a playback stop button as the function button 60 that corresponds to the operation state (during playback), and causes the playback stop button to move closer to the tap position. As a result, the user can easily find the playback stop button and can stop the playback of the desired piece of music.

Further, the above-described operation state and another selection condition can be combined and used to select the function button 60 and to thereby achieve movement display. More specifically, in the playback mode, when it is detected that the surrounding environment is a special environment, the music player selects and moves the function button 60 that corresponds to the operation state and also corresponds to the surrounding environment. For example, in a case where the music player is used in a loud noise environment, when the user taps the display screen 50, the music player detects the noise, and moves a noise cancelling function setting button to the tap position. As a result, the user can easily and rapidly find the noise cancelling function setting button to address a loud noise environment, only by a simple operation of tapping the display screen 50.

(2) Example Applied to Car Navigation Device

Next, an embodiment will be described in which the information processing device of the present invention is applied to an on-board device, particularly, to a car navigation device. The car navigation device is a device that provides a current position and a direction of a vehicle in conjunction with a GPS system. The touch panel 16 is also widely used in a display device of the car navigation device. When the user presses one of the function buttons 60 on the display screen 50, the user can cause the car navigation device to perform a specific function.

The car navigation device displays a car navigation screen and provides a car navigation function. When the user taps the display screen 50 of the car navigation device during a car navigation operation, the car navigation device selects, based on its operation state and another selection condition, the function button 60 that is appropriate for the operation state and the like, and moves and displays the selected function button 60.

First, an example will be described in which the function button 60 corresponding to the operation state is selected and the selected function button 60 is moved and displayed. When the user taps the display screen 50 of the car navigation device during the car navigation operation, the car navigation device may select a button to move a display range to a current position or a button having a frequently used function, and may display the selected button such that it moves closer to the tap position. If the user searches for a desired one of the function buttons 60 on the display screen 50 while driving the vehicle, it involves a risk. However, as in the present embodiment, if the navigation device is designed such that an appropriate one of the function buttons 60 moves closer to the tap position by simply tapping the display screen 50, there is no need for the user to search for the button. As a result, safety, as well as user-friendliness, is improved.

Next, an example will be described in which the function button 60 that also corresponds to a condition other than the operation state is selected, and the selected function button 60 is moved and displayed. When the user taps the display screen 50 during the car navigation operation, the car navigation device may select the function button 60 that corresponds to the current position, and may display the selected function button 60 such that it moves closer to the tap position. In this case, it is possible to change the function button 60 to be moved closer to the tap position, depending on the current position of the car navigation device. For example, when driving in a town, the function button 60 to search for a parking lot may be moved closer to the tap position. When driving on an expressway, the function button 60 to listen to traffic information or the function button 60 to check information such as a special local product or event of each district may be moved closer to the tap position. Thus, the user can easily find the function button 60 that is appropriate for the current position, which is convenient. In addition, if the user taps the display screen 50 when the amount of gasoline in the vehicle is small, the function button 60 to search for a gas station may be moved closer to the tap position. In this case, the user can easily find the function button 60 that is appropriate for the situation of the vehicle, which is convenient.

(3) Example Applied to Menu Screen

Next, an embodiment will be described in which the information processing device of the present invention is applied to a given electronic device that displays a menu screen. The menu screen is used in various types of electronic devices. Since the menu screen displays a lot of the function buttons 60, it may be difficult for the user to find a desired one of the function buttons 60. Given this, if the function button 60 corresponding to an operation state or the like of the electronic device moves closer to the tap position on the menu screen, it improves user-friendliness.

For example, if the user taps the display screen 50 when the electronic device is activated for the first time and the menu screen is displayed, the electronic device may automatically select the function button 60 that relates to various initial settings, such as clock setting, and may move the selected function button 60 to the tap position. In this case, even if the user uses the electronic device for the first time and the user is unfamiliar with the electronic device, the user can easily perform the initial settings. Further, if the menu screen is displayed when the electronic device is used in another country, the electronic device may automatically select the function button 60 that relates to time setting, area setting and the like, and may move the selected function button 60 to the tap position. In this case, it is possible to easily perform the initial settings when the electronic device is used in any country.

6. Conclusion

The information processing device according to the exemplary embodiment of the present invention and the display method thereof is described above. According to the present embodiment, when the user specifies (taps, for example) a position on the display screen 50, a necessary one of the function buttons 60 that is appropriate for the operation state at that time moves from the default position such that it approaches a particular position on the display screen 50 specified by the user. Therefore, even when a lot of the function buttons 60 are present on the display screen 50, the user can easily find a desired one of the function buttons 60 on the display screen 50. As a result, it is possible to omit a troublesome operation to find the desired one of the function buttons 60.

Even when the user does not know which of the function buttons 60 on the display screen 50 corresponds to which function, an appropriate button that corresponds to the operation state of the device moves closer to the tap position. Therefore, the user can easily find a desired one of the function buttons 60.

Further, in the related art, it is difficult for the user to find a desired function button on a complicated and dynamic display screen. In addition, in some cases, it is difficult for the user to press the desired function button at a desired timing. The "complicated and dynamic display screen" indicates, for example, a case in which a lot of function buttons including a REC button (for example, a white button) are superimposed and displayed on a live view image (for example, a white subject) that is constantly displayed in the image capture mode of a digital camera. However, in the present embodiment, a desired one of the function buttons 60 moves closer to the position (the tap position) specified by the user. Therefore, even under a complicated screen condition such as that described above, the user can easily find a desired one of the function buttons 60.

Further, the function button 60 moves closer to the position specified by the user. Therefore, if the user specifies an easy-to-operate position on the display screen 50, the user can easily press the function button 60. For example, when the user captures an image while holding a digital camera with both hands, if the user specifies the right edge of the display screen 50 using his/her right thumb, the user can easily presses the REC button 60A that has moved closer to the specified position.

Furthermore, not only the operation state of a device such as the imaging device 10, but also various conditions are combined and used as a selection condition of the function button 60. Examples of the various conditions include a surrounding environment, an object that is being displayed, a specified position on the display screen 50, a specified icon, a current position or a current time, a contact pressure or a contact time of an operating body, a posture of the device and the like. As a result, depending on the preference of the user and various situations, the function button 60 that is more appropriate can be selected and moved while it is being displayed.

The exemplary embodiment of the present embodiment is described above in detail with reference to the appended drawings. However, the present invention is not limited to these examples. It should be understood by those skilled in the art that various modifications, combinations, sub-combinations and alterations may occur depending on design requirements and other factors insofar as they are within the scope of the appended claims or the equivalents thereof.

For example, in the above-described embodiment, the function button 60 that is selected in accordance with the operation state is displayed such that it moves closer to the tap position. However, the present invention is not limited to this example. For example, the selected function button 60 may be displayed such that it moves closer to the tap position while emitting light, vibrating, changing shape (enlarging, for example), changing color, or increasing transparency. Moreover, animation display or text display may be added.

In the above-described embodiment, the function button 60 is moved in response to the tap by the user on the display screen 50. However, the present invention is not limited to this example. For example, the function button 60 may be moved in response to a user's action, such as tracing the display screen 50, dragging on the display screen 50, or swinging the device. Further, the function button 60 may be moved in response to a condition (for example, time specification, or a sensor's detection of environment such as light, heat, pressure, acceleration etc.) other than the user's action.

The present application contains subject matter related to that disclosed in Japanese Priority Patent Application JP 2009-212071 filed in the Japan Patent Office on Sep. 14, 2009, the entire content of which is hereby incorporated by reference.

What is claimed is:

1. An information processing device comprising:
a display portion that displays a plurality of function buttons that respectively correspond to a plurality of functions included in the information processing device such that a corresponding function of the information processing device is activated when one of the plurality of function buttons is pressed by a user;
a position detection portion that detects a position where an operating body touches or approaches a display screen of the display portion, the position being a position of a first function button of the plurality of function buttons;
a button selection portion that selects, from among the plurality of function buttons, at least one function button related to the first function button; and
a display control portion that causes the at least one function button selected by the button selection portion to move on the display screen such that the at least one function button approaches the first function button and maintains a position on the display screen of function buttons not selected by the button selection portion.

2. The information processing device according to claim 1, further comprising:
an environment detection portion that detects a surrounding environment of the information processing device, wherein the button selection portion selects, from among the plurality of function buttons, a function button that corresponds to the operation state of the information processing device, and also corresponds to the surrounding environment of the information processing device.

3. The information processing device according to claim 1, further comprising:
an object recognition portion that recognizes an object that is being displayed on the display screen, wherein the button selection portion selects, from among the plurality of function buttons, a function button that corresponds to the operation state of the information processing device, and also corresponds to the object that is being displayed on the display screen.

4. The information processing device according to claim 1, wherein the button selection portion selects, from among the plurality of function buttons, a function button that corresponds to the operation state of the information processing device, and also corresponds to the position on the display screen detected by the position detection portion.

5. The information processing device according to claim 1, wherein the button selection portion selects, from among the plurality of function buttons, a function button that corresponds to the operation state of the information processing device, and also corresponds to an icon that is displayed at the position on the display screen detected by the position detection portion.

6. The information processing device according to claim 1, wherein the button selection portion selects, from among the plurality of function buttons, a function button that corresponds to the operation state of the information processing device, and also corresponds to one of a current position and a current time of the information processing device.

7. The information processing device according to claim 1, wherein the button selection portion selects, from among the plurality of function buttons, a function button that corresponds to the operation state of the information processing device, and also corresponds to one of a contact pressure and a contact time of the operating body on the display screen.

8. The information processing device according to claim 1, further comprising:
a posture sensor that detects a posture of the information processing device, wherein the button selection portion selects, from among the plurality of function buttons, a function button that corresponds to the operation state of the information processing device, and also corresponds to the posture of the information processing device.

9. The information processing device according to claim 1, wherein the button selection portion selects a function button most commonly selected by the user in the operation state.

10. The information processing device according to claim 1, wherein the button selection portion selects a function button registered by the user for movement in the operation state.

11. The information processing device according to claim 1, wherein the button selection portion selects the at least one function button based on a current time.

12. A display method, comprising:
displaying a plurality of function buttons that respectively correspond to a plurality of functions capable of being performed by an information processing device such that a corresponding function of the information processing device is activated when one of the plurality of function buttons is pressed by a user;
detecting a position where an operating body touches or approaches a display screen of a display portion, the position being a position of a first function button of the plurality of function buttons;
selecting, from among the plurality of function buttons, at least one function button related to the first function button; and
causing the at least one function button to move on the display screen such that the at least one function button approaches the first function button and maintaining a position on the display screen of function buttons not selected by the selecting.

13. A non-transitory computer readable medium encoded with instructions that command a computer to perform a method comprising:
displaying a plurality of function buttons that respectively correspond to a plurality of functions capable of being performed by an information processing device such that a corresponding function of the information processing device is activated when one of the plurality of function buttons is pressed by a user;
detecting a position where an operating body touches or approaches a display screen of a display portion, the position being a position of a first function button of the plurality of function buttons;
selecting, from among the plurality of function buttons, at least one function button related to the first function button; and
causing the at least one function button to move on the display screen such that the at least one function button approaches the first function button and maintaining a position on the display screen of function buttons not selected by the selecting.

* * * * *